US008442475B2

(12) United States Patent
Antonio et al.

(10) Patent No.: US 8,442,475 B2
(45) Date of Patent: May 14, 2013

(54) POWER CONSERVATION IN WIRELESS ACCESS TERMINALS USING INTEGRATED PROXY FUNCTION

(75) Inventors: Franklin Antonio, San Diego, CA (US); Samir S. Soliman, San Diego, CA (US); Olufunmilola O. Awoniyi, San Diego, CA (US); Soumya Das, San Diego, CA (US); Nishith Chaubey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 12/946,348

(22) Filed: Nov. 15, 2010

(65) Prior Publication Data
US 2012/0122511 A1 May 17, 2012

(51) Int. Cl.
*H04B 1/16* (2006.01)

(52) U.S. Cl.
USPC .............. 455/343.1; 455/343.2; 455/343.5; 455/511; 455/515

(58) Field of Classification Search .......... 455/511, 455/515, 522, 574, 343.1, 343.2, 343.5, 67.11, 455/130, 73, 91
See application file for complete search history.

(56) References Cited

U.S. PATENT DOCUMENTS

| 2003/0107475 | A1 | 6/2003 | Bautista et al. |
| 2005/0130713 | A1* | 6/2005 | Simpson et al. ............. 455/574 |
| 2006/0029024 | A1* | 2/2006 | Zeng et al. ................... 370/335 |
| 2010/0099404 | A1* | 4/2010 | Khoo et al. ................... 455/433 |

FOREIGN PATENT DOCUMENTS

| EP | 2056480 A1 | 5/2009 |
| GB | 2271915 A | 4/1994 |
| WO | 9011652 A1 | 10/1990 |

OTHER PUBLICATIONS

International Search Report and Written Opinion—PCT/US2011/060438—ISA/EPO—Feb. 23, 2012.

\* cited by examiner

*Primary Examiner* — Tuan Pham
(74) *Attorney, Agent, or Firm* — Jeffrey D. Jacobs

(57) ABSTRACT

A power conservation scheme is provided for conserving power in an access terminal that includes a dedicated proxy circuit, a receiver/transmitter chain, and/or a baseband processor. The baseband processor is adapted to determine when a wireless communication link with an access network has been inactive for at least a threshold amount of time. If such inactivity is ascertained, the baseband processor sends a proxy request to the proxy circuit. Upon receiving such proxy request, the proxy circuit monitors a data, control, and/or paging channel on behalf of the access terminal while the baseband processor is powered down. If a signal is received for the access terminal over the monitored channel, then a wake-up signal is sent to the baseband processor to cause it to power up and monitor a data channel. Upon receiving a response from the baseband processor, the proxy circuit may stop operating as a proxy.

37 Claims, 17 Drawing Sheets

| | Scenario 1 | Scenario 2 | Scenario 3 |
|---|---|---|---|
| Operating State | Idle | Idle + Cell_FACH | Idle + Cell_FACH with High Speed channel. |
| Channels | P-SCH/S-SCH, CPCH, P-CCPCH, S-CCPCH, PICH (R'99) (Pre Rel. 7) | P-SCH/S-SCH, CPCH, P-CCPCH, S-CCPCH, PICH (R'99) (Pre Rel. 7) | P-SCH/S-SCH, CPCH, P-CCPCH, S-CCPCH, PICH, HS-SCCH, HS-PDSCH (R'99 and HS Channel) (Rel. 7 and above) |
| UMTS TX & TX Memory | Not Required | Not Required | Not Required |
| Searcher | Required | Required | Required |
| Chip-level Processor | Required - Rake only; does not require all processing related to Cell_DCH and Cell_FACH. | Required - Rake only; does not require all processing related to Cell_DCH. | Required - Rake/Equalizer only with SCH cancellation; does not require all processing related to Cell_DCH. |
| Symbol-level Processor | Required -R'99 rate matching and interleaving required. | Required -R'99 rate matching and interleaving required. | Required -R'99 and HSDPA rate matching and interleaving required. |
| Viterbi Decoder | Required | Required | Required |
| Turbo Decoder | Not Required | Not Required | Required |
| Rx Chain 1 | Not Required | Not Required | Not Required |
| Sample Buffer 1 | Not Required | Not Required | Not Required |
| Decoder Buffer | Required | Required | Required |

FIG. 13

|  | Scenario 1 | Scenario 2 | Scenario 3 |
|---|---|---|---|
| Operating State | Idle | Idle + Cell_FACH | Idle + Cell_FACH with High Speed channel. |
| Channels | P-SCH/S-SCH, CPCH, P-CCPCH, S-CCPCH, PICH (R'99) (Pre Rel. 7) | P-SCH/S-SCH, CPCH, P-CCPCH, S-CCPCH, PICH (R'99) (Pre Rel. 7) | P-SCH/S-SCH, CPCH, P-CCPCH, S-CCPCH, PICH, HS-SCCH, HS-PDSCH (R'99 and HS Channel) (Rel. 7 and above) |
| UMTS TX & TX Memory | Not Required | Not Required | Not Required |
| Searcher | Required | Required | Required |
| Chip-level Processor | Required - Rake only; does not require all processing related to Cell_DCH and Cell_FACH. | Required - Rake only; does not require all processing related to Cell_DCH | Required - Rake; does not require all processing related to Cell_DCH. |
| Symbol-level Processor | Required -R'99 rate matching and interleaving required. | Required -R'99 rate matching and interleaving required. | Required -R'99 and HSDPA rate matching and interleaving required. |
| Viterbi Decoder | Required | Required | Required |
| Turbo Decoder | Not Required | Not Required | Not Required |
| Rx Chain 1 | Not Required | Not Required | Not Required |
| Sample Buffer 1 | Not Required | Not Required | Not Required |
| Decoder Buffer | Required | Required | Required |

FIG. 17

POWER CONSERVATION IN WIRELESS ACCESS TERMINALS USING INTEGRATED PROXY FUNCTION

RELATED APPLICATIONS

The present application is related to U.S. Utility patent application Ser. No. 12/946,134, entitled "Data Resume Indicator for Mobile Device Power Conservation" filed Nov. 15, 2010, and assigned to the assignee hereof and hereby expressly incorporated by reference herein.

FIELD

Various features pertain to wireless communication systems. At least one feature pertains to facilitating power conservation in a wireless access terminal by using an internal proxy function or circuit that independently monitors a channel while a baseband processor and/or primary receiver/transmitter chains are Off or in low power states, and the proxy function or circuit wakes up the primary receiver/transmitter chain and/or baseband processor when a wireless transmission for the access terminal is expected.

BACKGROUND

Access terminals, such as laptop computers, personal digital assistant devices, mobile or cellular phones, or any other device with a processor, that communicate with other devices through wireless signals are becoming increasingly popular. Access terminals are typically battery-powered and the amount of power a battery can provide is limited. With consumers using powerful applications that run on the access terminals, particularly entertainment media and imaging applications, conserving battery power is important.

A conventional access terminal often includes a baseband processor that may perform several functions, including processing signals to and/or from one or more communication interfaces. Such baseband processor tends to be integrally involved in the operation of the access terminal, thereby making it difficult to turn it Off completely. For instance, an access terminal may operate in one of several modes depending on the communication standard being implemented in a wireless network. For example, Wideband Code Division Multiple Access (WCDMA) includes various types of "connected" modes (e.g., Radio Resource Control states—Cell Dedicated Channel (CELL_DCH) state, a "quasi-connected" mode such as Cell Forward Access Channel FACH (CELL_FACH) state, Cell Paging Channel (CELL_PCH) state, and UTRAN (UMTS Terrestrial Radio Access Network) Registration Area URA Paging Channel (URA_PCH) state, and a "lowered power" mode such as Idle mode). Typically, in the connected mode the baseband processor (and/or other circuits and components of a receiver/transmitter chain) may be fully or partially turned On to allow the access terminal to receive and/or transmit data (e.g., voice or data calls or sessions) with one or more access nodes (e.g., base stations, Node B, femto cell, etc.). In connected mode, conventional a baseband processor may consume a significant amount of power along with the circuitry (e.g., receiver/transmitter chain) needed to monitor a data or control channel and/or maintain a connection with the access node. In Idle state, the access terminal may monitor a paging channel, such as a paging channel (PCH) for paging messages. While power consumption in idle mode is substantially less than in connected mode, the baseband processor is still fully or partially turned On to facilitate monitoring of the control channel. Consequently, the access terminal is still being drained of significant power by the baseband processor and other circuitry or components of its receiver/transmitter chain.

Therefore, there is a need for a solution that reduces power consumption of an access terminal.

SUMMARY

One feature provides a system and method for facilitating power conservation in an access terminal by using a dedicated proxy function, circuit, or module that listens for pages or control signals in a control channel on behalf of the access terminal while the access terminal turns off its receiver and/or transmitter chain, including the baseband processor. The proxy function, circuit, or module then monitors the control channel. Upon receipt of a page or control signal for the access terminal, the proxy function, circuit, or module causes the baseband processor and/or receiver/transmitter chain, to switch to a quasi-connected or connected mode so that it can receive a subsequent transmission over a data channel.

According to a first feature, an access terminal is provided comprising a dedicated proxy circuit, a first receiver/transmitter chain, and/or a baseband processor communicatively coupled to the first receiver/transmitter chain and baseband processor. The first receiver/transmitter chain may be adapted to communicate with an access network over a plurality of wireless channels. According to an example, the plurality of wireless channels may include one or more data channels and one or more control channels.

The baseband processor may also be adapted to switch to a power conservation mode (e.g., idle mode, sleep mode, off mode) if at least some of the plurality of wireless channels have been inactive for at least a threshold amount of time. For example, the power conservation mode of the baseband processor may be either a low power mode or an off mode. In one example of such power conservation mode, the baseband processor may be unable to monitor the plurality of wireless channels. In the power conservation mode, the baseband processor may be unable to monitor the first channel, and in the quasi-connected or connected mode the baseband processor may be able to monitor the plurality of wireless channels. In order to switch to power conservation mode, the baseband processor may (a) determine that at least some of the plurality of wireless channels have been inactive for at least the threshold amount of time, and/or (b) sends a proxy request to the proxy circuit prior to switching to the power conservation mode.

Upon receipt of the proxy request from the baseband processor, the proxy circuit may monitor the first channel for incoming data or control signals. Subsequently, upon receipt of a data or control signal for the access terminal, the proxy circuit may send a wake-up signal to the baseband processor. That is, during the power conservation mode of the baseband processor, the proxy circuit may independently monitor at least a first channel (e.g., a paging channel, a control channel, and/or a data channel) from the plurality of wireless channels while the baseband processor is in the power conservation mode. In one example, the first channel may include a forward access channel carrying at least one of paging signals, data signals, or control signals. In one example, monitoring of the first channel by the proxy circuit may be transparent to the access network. The proxy circuit may consume less power than the baseband processor for the same amount of channel monitoring time.

Subsequently, the baseband processor may be switched from the power conservation mode to a quasi-connected or connected mode upon receiving a wake-up signal from the proxy circuit indicating that a data or control signal has been received for the access terminal. The proxy circuit may forward the received data or control signal to the baseband processor. The baseband processor may send a wake-up signal response to the proxy circuit upon switching to the quasi-connected or connected mode, where the wake-up signal response causes the proxy circuit to switch to a low power mode or an off mode. In one example, the quasi-connected mode may be a Cell Forward Access (CELL_FACH) state as defined in a Radio Resource Control (RRC) layer of a Universal Mobile Telecommunications System (UMTS) Wideband Code Division Multiple Access (W-CDMA) wireless interface standard.

In one implementation, the proxy circuit may include an independent receiver chain to monitor the first channel. In such implementation, upon switching the baseband processor to the power conservation mode, the first receiver/transmitter chain is also switched to the power conservation mode (e.g., an idle, sleep or off mode). In another implementation, the proxy circuit may share part or all of the first receiver/transmitter chain to monitor the first channel. The proxy circuit may also include a processing circuit and a wake-up radio/modem circuit. The processing circuit may be coupled to the independent receiver chain and adapted to determine whether a data or control signal received over the first channel is intended for the access terminal. The wake-up radio circuit coupled to the processing circuit and the baseband processor and adapted to send a wake-up signal to the baseband processor to cause the baseband processor to switch to a quasi-connected or connected mode. In this implementation, the baseband processor may also shut down the first receiver/transmitter chain (either completely or partially) when it enters the power conservation mode and starts up the first receiver/transmitter chain when a wake-up signal is received from the proxy circuit. The first receiver/transmitter chain may be coupled to a first antenna for monitoring the plurality of wireless channels while the proxy circuit may be coupled to a separate second antenna for monitoring the first channel.

In an alternative implementation, the proxy circuit may include a processing circuit and a wake-up radio circuit, but the proxy circuit reuses or shares part or all of the first receiver/transmitter chain to monitor the first channel. That is, the first receiver/transmitter chain may be at least partially operational when the baseband processor is in the power conservation mode.

In one implementation, the access network may provide a data resume indicator over the first channel prior to transmitting a data message over a data channel within the plurality of wireless channels. That is, the access network may have been informed that the baseband processor has been switched to the power conservation mode. The proxy circuit forwards a received data resume indicator to the baseband processor and this acts as a wake-up signal to the baseband processor.

Similarly, a method operational on an access terminal is provided. A first receiver/transmitter chain and/or a baseband processor may be operated in a quasi-connected or connected mode. In such quasi-connected or connected mode, at least some of a plurality of wireless channels are monitored for incoming transmissions to the access terminal from an access network. A proxy request may be sent from the baseband processor to a dedicated proxy circuit within the access terminal if at least some of the plurality of wireless channels have been inactive for at least a threshold amount of time. The baseband processor may then be switched to a power conservation mode while the proxy circuit monitors a first channel (e.g., a paging channel) from the plurality of wireless channels. In one example, e.g., where a data resume indicator is unavailable, such monitoring of the first channel by the proxy circuit may be transparent to the access network.

A wake-up signal may be sent from the proxy circuit to the baseband processor if a data or control signal is received for the access terminal. The wake-up signal may cause the baseband processor to switch to the quasi-connected or connected mode. Additionally, a received data or control signal may be forwarded from the proxy circuit to the baseband processor. A wake-up signal response may be sent to the proxy circuit upon switching to the quasi-connected or connected mode, where the wake-up signal response causes the proxy circuit to switch to a low power mode or an off mode.

In an alternative method, the proxy device may receive a data resume indicator over the first channel at the proxy circuit from the access network, the data resume indicator indicating that the access network is about to send a data message. Consequently, a wake-up signal may be sent from the proxy circuit to the baseband processor in response to receipt of the data resume indicator.

According to a second feature, a proxy device may be operational within an access terminal to facilitate power conservation. The proxy device may include a receiver chain, a processing circuit, and/or a wake-up radio circuit. The receiver chain may be adapted to wirelessly monitor a first channel for transmissions from an access network. The receiver chain may either be a dedicated receiver chain or it may be shared among the proxy device and the baseband processor. The processing circuit may be coupled to the receiver chain and adapted to (a) monitor the first channel via the receiver chain upon receiving a proxy request from a baseband processor for the access terminal, and/or (b) determine if a data or control signal has been received for the access terminal. Note that the monitoring of the first channel by the proxy circuit may be transparent to the access network (e.g., in schemes where no data resume indicator is available). The proxy request may be received only after one or more wireless channels between the access terminal and access network have been inactive for at least a threshold amount of time.

The wake-up radio circuit may be coupled to the processing circuit and adapted to send a wake-up radio signal to the baseband processor upon receiving an indicator from the processing circuit that the data or control signal has been received for the access terminal.

The processing circuit may be further adapted to send a proxy response to the baseband processor upon receipt of the proxy request, allowing the baseband processor to switch to a power conservation mode. The processing circuit may be further adapted to: (a) receive a wake-up radio response signal from the baseband processor, and (b) switch the proxy device to a low power mode or an off mode. Thus, the proxy device is in a low power mode or off mode while the baseband processor is in a quasi-connected or connected mode in which it monitors one or more wireless channels from the access network.

According to one implementation, the processing circuit may be further adapted to: (a) receive a data resume indicator from the access network, and/or (b) send the data resume indicator to the wake-up radio circuit to cause the baseband processor to switch to a quasi-connected or connected mode.

Similarly, a method operational on a proxy device is provided. A proxy request may be received from a baseband processor. The proxy request may be received only after one or more wireless channels between the access terminal and access network have been inactive for at least a threshold amount of time. Consequently, the proxy device may monitor a first channel for an access network via a receiver chain. The proxy device may then determine if a data or control signal has been received for the access terminal. A wake-up radio signal may then be sent to the baseband processor upon receiving the data or control signal for the access terminal. Upon receipt of the proxy request, the proxy device may send a proxy response to the baseband processor, allowing the baseband processor to switch to a power conservation mode. After sending the wake-up radio signal, the proxy device may receive a wake-up radio response signal from the baseband processor, causing the proxy device to switch to a low power mode or an off mode. Note that, the proxy device may be in a low power mode or off mode while the baseband processor is in a quasi-connected or connected mode in which it monitors one or more wireless channels from the access network.

BRIEF DESCRIPTION OF THE DRAWINGS

The features, nature, and advantages of the present features may become more apparent from the detailed description set forth below when taken in conjunction with the drawings in which like reference characters identify correspondingly throughout.

FIG. 13 is a table illustrating various possible implementation scenarios in which a proxy may monitor one or more channels according to the requirement of one or more operating states for the access terminal.

FIG. 17 is a table illustrating various possible implementation scenarios in which a proxy may monitor one or more channels according to the requirement of one or more operating states for the access terminal when DRI is implemented by the access network.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

In the following description, certain terminology is used to describe certain features of one or more embodiments. For instance, the term "access node" refers to a device that facilitates wireless connectivity (for wireless communication devices) to a communication or data network. The term "access node" may include base stations, Node-B devices, femto cells, pico cells, etc. The term "access terminal" refers to mobile phones, pagers, wireless modems, personal digital assistants, personal information managers (PIMs), palmtop computers, laptop computers, and/or other wireless or mobile communication/computing devices which communicate, at least partially, through a wireless or cellular network. The term "proxy" may refer to any function, device, circuit, or module having wireless communication capabilities to receive a page or control message intended for the access terminal to which the proxy couples or within which the proxy is housed.

Overview

One feature provides a system, apparatus, and method for facilitating power conservation in an access terminal by using an internal, integrated, and/or dedicated proxy function, circuit, or module. The access terminal may be powered by an internal power source (e.g., battery) that powers its communication interfaces, circuits, processor(s), and module(s). During operation, rather than staying in a connected mode when no data is being received or sent, the access terminal may turn Off its baseband processor and, optionally, a receiver/transmitter chain to conserve power while tasking the dedicated proxy with listening or monitoring paging, control and/or data channels for incoming paging, control and/or data signals for the access terminal. One difference between the baseband processor and the proxy is that the proxy may consume less power while monitoring a paging, control and/or data channel. The proxy sends a wake-up signal to the baseband processor upon receiving a paging, control and/or data signal for the access terminal. The baseband processor may then cause the receiver/transmitter chain (and/or other components) to be turned On (if it had been powered Off).

Exemplary Network Environment and Proxy Mode

Figure 1:
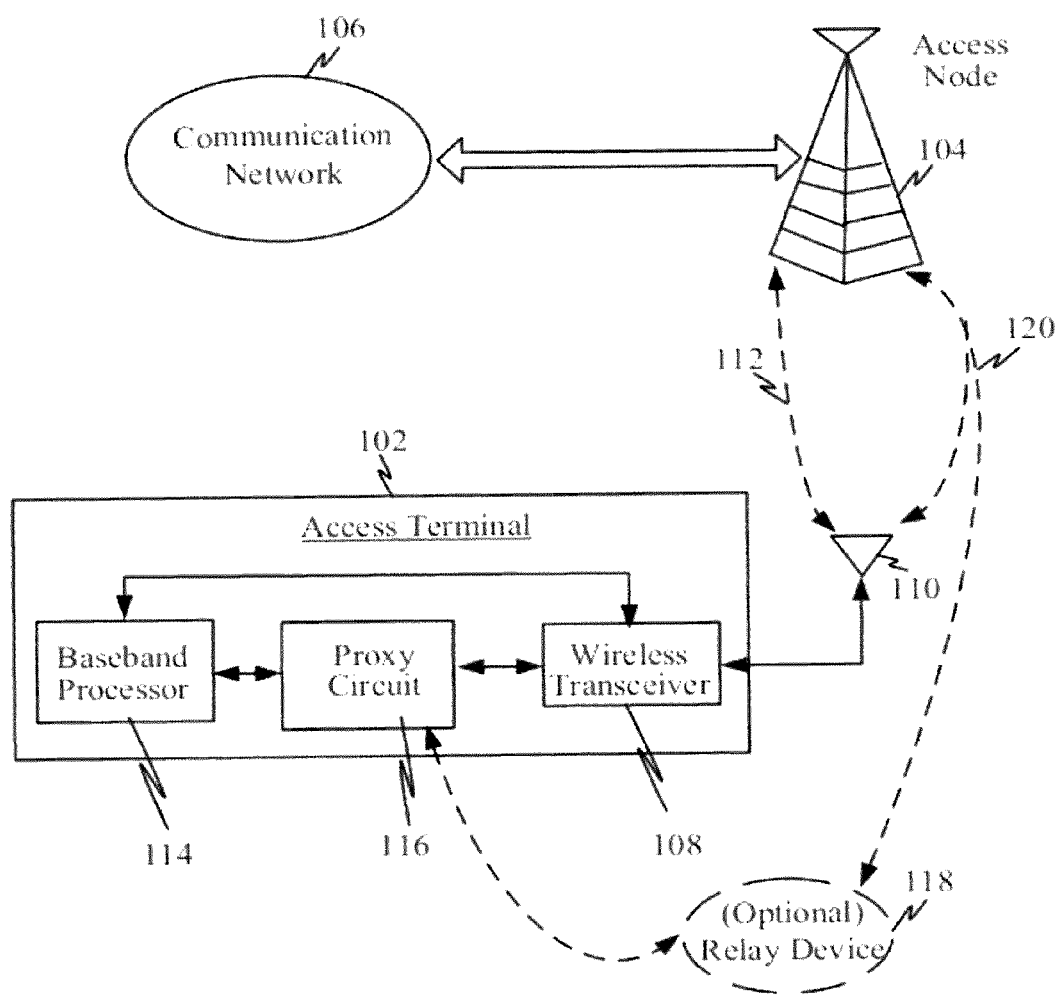
FIG. 1 is a block diagram illustrating a wireless communication system in which an internal, integrated, and/or dedicated proxy circuit may facilitate power conservation in an access terminal.

FIG. 1 is a block diagram illustrating a wireless communication system in which an internal, integrated, and/or dedicated proxy circuit may facilitate power conservation in an access terminal. An access terminal 102 may be adapted for communications with an access node 104 which may be coupled to a communication network 106. The access terminal may include a wireless transceiver 108 (e.g., a receiver/transmitter chain and/or other circuits or components), a proxy circuit 116, and a baseband processor 114. The wireless transceiver 108 may be coupled to an antenna 110 to wirelessly communicate with the access node 104 over a control and/or data channel 112. The proxy circuit 116 may be adapted to monitor a signaling channel 120 (e.g., paging channel, data signaling channel, control signaling channel, etc.) on behalf of the access terminal 102 when the baseband processor 114 and, optionally, the wireless transceiver 108 are turned Off. In one embodiment, the baseband processor 114 is turned Off so that the proxy circuit 116 may reuse the wireless transceiver 108 to monitor the signaling channel 120. In an alternative implementation, the proxy circuit 116 may have its own transceiver circuit for wirelessly monitoring the signaling channel 120, consequently both the baseband processor 114 and wireless transceiver 108 may be turned Off by the access terminal 102. The signaling channel 120 may be received, for example, directly or indirectly (e.g., via an optional relay device 118) from the access node 104.

Note that the data channel 112 may operate on a first frequency band or channel while the signaling channel 120 may operate on a second frequency band or channel different or distinct from the first frequency band or channel. In one implementation, the proxy circuit 116 may consume less power than the baseband processor 114 and/or wireless transceiver 108.

The access terminal 102 may operate in various modes, including a first (or connected) mode and a second (or idle/sleep) mode. While in the connected mode, the access terminal 102 may use its baseband processor 114 and/or wireless transceiver 108 to communicate with the access node 104 to establish a call/session for receiving and/or transmitting data messages. In connected mode, the access terminal 102 may continuously or frequently monitor its control and/or data channel 112. The operating mode of the access terminal 102 is typically set by an entity in the communication network 106 and communicated to the access terminal 102 via the access node 104. Therefore, the access node 104 may know the connected mode (e.g., Radio Resource Control state—CELL_DCH) or quasi-connected mode (Radio Resource Control state—CELL_FACH, CELL_PCH, or URA_PCH)) of the access terminal 102. However, in one embodiment, the access terminal may communicate its operating mode to the communication network 106 via the access node 102.

In order to conserve power, the access terminal 102 may be configured to unilaterally change its operating mode (or at least the operating state of the baseband processor 114 and/or wireless transceiver 108) from connected mode to an internal proxy mode without necessarily notifying the access node 104 or the communication network 106 of this change. That is, when no control information or data is detected for this particular access terminal 102, the baseband processor 114 and/or wireless transceiver 108 may be turned Off, thereby conserving power. Because the circuits and/or functions of the baseband processor 114 are highly integrated and perform many different functions, it is often difficult to merely turn Off just a portion of the baseband processor 114 for power conservation. For example, just to monitor a paging channel, a receiver chain and many other circuits of the baseband processor 114 would typically be powered On. By contrast, the separate proxy circuit 116 may include just the circuits, components, and/or modules needed to perform its limited monitoring operations of the signaling channel 120. Consequently, the proxy circuit 116 may be significantly more power efficient than the baseband processor 114 in performing such signaling channel monitoring task.

Prior to changing from the connected mode to the proxy mode, the access terminal 102 may request the proxy circuit 116 monitor the signaling channel 120 on behalf of the access terminal 102. As the baseband processor 114 and/or wireless transceiver 108 consume more power than the proxy circuit 116, shutting Off the baseband processor 114 and/or wireless transceiver 108 and instead using the proxy circuit 116 to receive incoming control and/or data signaling messages (e.g., paging messages) may achieve power conservation at the access terminal 102.

The proxy circuit 116 then monitors the signaling channel 120 and, if a control or data signal (e.g., paging message) for the access terminal 102 is detected, it sends a wake-up signal to cause the baseband processor 114. In implementations where the wireless transceiver 108 has been powered Off during proxy mode, the wireless transceiver 108 may also be powered On. After the baseband processor 114 and wireless transceiver 108 have been powered On, the access terminal 102 may receive a subsequent control and/or data message over the data channel 112.

According to one feature, the proxy scheme within the access terminal 102 may be transparent to the rest of the communication system, including the access node 104. Therefore, the access node 104 may not be informed that the access terminal 102 has modified its connected mode to the internal proxy mode. That is, the access node 104 may never learn of the changes in operating modes of the access terminal 102, from connected mode to proxy mode and back to connected mode.

As used herein, the access node 104 may be a device that can wirelessly communicate with one or more access terminals and may also be referred to as, and include some or all the functionality of, a base station, a Node B, or some other similar devices. An access terminal may also be referred to as, and include some or all the functionality of, a user equipment (UE), a wireless communication device, a client terminal, a mobile station, computer, laptop, mobile phone, cellular phone, or some other terminology.

Exemplary Primary Communication Interface

The wireless transceiver 108 and/or baseband processor 114 may define a primary communication interface. One example of such primary communication interface may be a long range, high power, and/or high bandwidth communication interface such as a W-CDMA compliant transceiver. However, in other examples, such high power interface may operate according contemporary communication standards, including but not limited to Wideband Code Division Multiple Access (W-CDMA), cdma2000 (also known as IMT Multi-Carrier (IMT-MC)), Global System for Mobile Communications (GSM), Worldwide Interoperability for Microwave Access (WiMax), Long Term Evolution (LTE), Evolution-Data Optimized (EVDO or EV-DO), and wireless local area network (WLAN) among others. The power conservation techniques described herein may be implemented on various types of wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Worldwide Interoperability for Microwave Access (Wi-Max). A CDMA system may implement a radio access technology (RAT) such as Wideband CDMA (W-CDMA), CDMA2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available.

Exemplary Proxy Communication Interface

The proxy circuit 116 may include an integrated or separate communication interface or it may reuse portions of the wireless transceiver 108. This proxy communication interface may permit the proxy circuit 116 to monitor the signaling channel 120. The integrated or separate communication interface used by the proxy circuit 116 for monitoring the signaling channel 120 may be similar to the primary communication interface (i.e., if the primary communication interface is WCDMA-compatible then the proxy circuit communication interface used in monitoring the signaling channel is also WCDMA-compatible). When the proxy circuit 116 is inside the access terminal 102 (as in the example of FIG. 1), the proxy circuit 116 may communicate with the baseband processor 114 and/or the wireless transceiver 108 via wired connections. Thus, in an alternative implementation, portions of the wireless transceiver 108 may be reused by the proxy circuit 116 for monitoring the signaling channel 120. In either the case (i.e., integrated proxy communication interface or reuse of the wireless transceiver 108), because the baseband processor 114 is powered off, power conservation at the access terminal 102 is still achieved by use of the proxy circuit 116.

Exemplary Operating Modes

Figure 2:
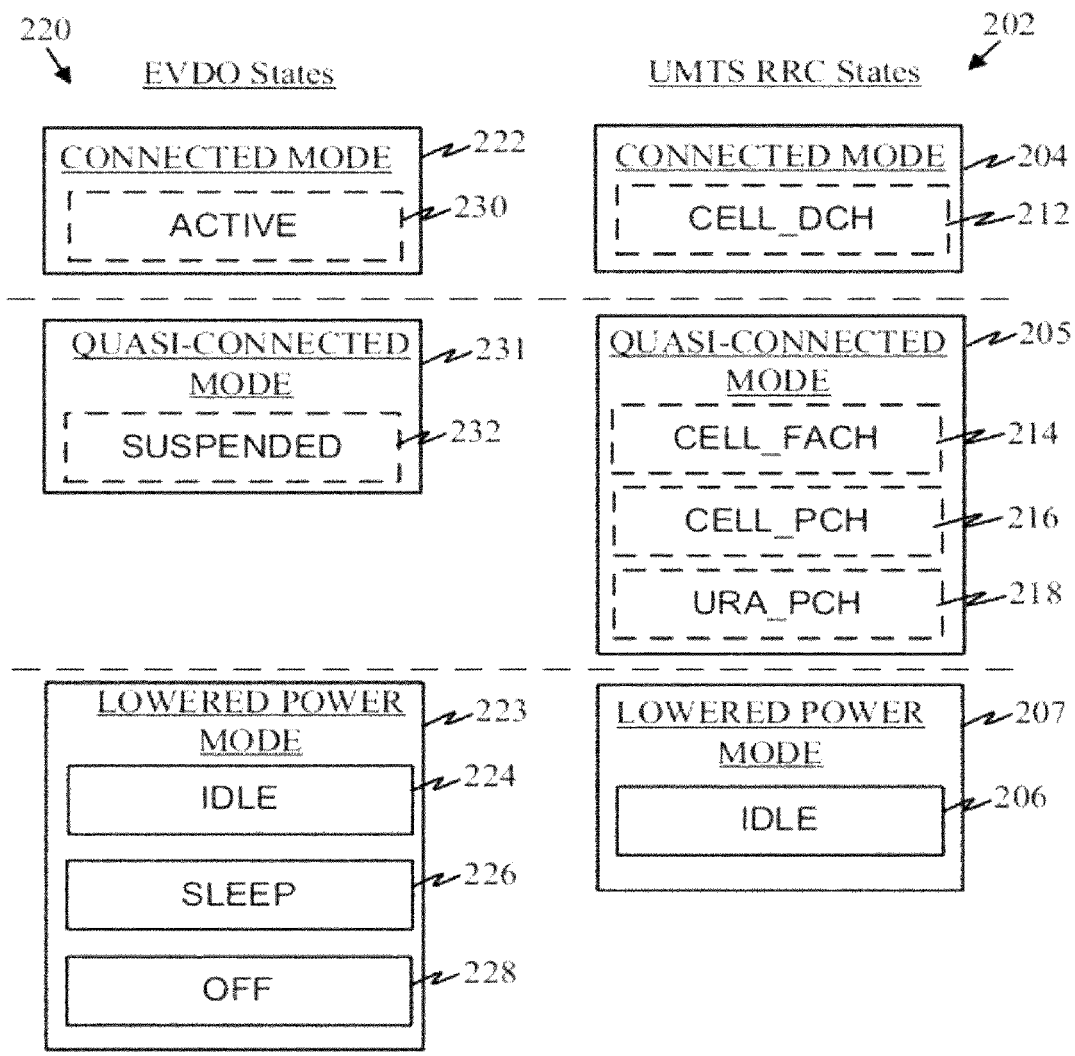
FIG. 2 illustrates two examples of operating modes for different wireless communication standards that may be implemented by the access terminal.

FIG. 2 illustrates two examples of operating modes for different wireless communication standards. In general, these operating modes may be described as connected mode, quasi-connected mode, and lowered power mode. A "connected mode" may refer to an operating state in which the primary communication interface is enabled, activated or powered On (e.g., continuously powered On, periodically powered On, momentarily powered On) to provide access to radio resources via a network. By contrast, a "lowered power mode" (e.g., "idle or sleep modes") refer to an operating state in which the primary communication interface is powered Off (e.g., continuously powered Off, periodically powered Off, momentarily powered Off) so that it does not have access to the radio resources via the network.

For example, the Universal Mobile Telecommunications System (UMTS) Wideband Code Division Multiple Access (W-CDMA) is an air interface standard that specifies a Radio Resource Control (RRC) defining various modes of operation. The UMTS RRC States 202 defines a connected mode 204, a quasi-connected mode 205, and/or a lowered power mode 207. In one example, the connected mode 204 may include CELL_DCH state 212, the quasi-connected mode may include CELL_FACH state 214, CELL_PCH state 216, and URA_PCH state 218, and the lowered power mode 207 may include the Idle state 206. In the connected and/or quasi-connected modes, access to the radio resources may be provided to the wireless network. The idle state 206 may have the lowest power consumption since the access terminal is not continuously transmitting or receiving information with the network but periodically turning on its circuitry (e.g., primary communication interface is periodically powered on) for reception of pages or monitoring network broadcasted system information. In idle mode, there is no connection to the wireless network. In connected mode and/or quasi-connected mode, the access terminal is assigned radio resources by the network and hence, the access terminal can transmit and receive information from the access node. For example, CELL_FACH 214 may consume roughly fifty percent the power of CELL_DCH 212, and CELL_PCH 216 consumes just a few percent of the power consumption of CELL_DCH 212.

Similarly, Evolution-Data Only (EVDO) is part of the CDMA2000 family of standards and defines a plurality of EVDO operating states 220, including a connected mode 222 such as an active mode 230, a quasi-connected mode 231 such as suspended mode 232, and a lowered power mode 223 such as an idle mode 224, a sleep mode 226, and/or an off mode 228. In connected, quasi-connected, and/or lowered power mode, the access terminal may have its baseband processor and/or receiver/transmitter chain fully, partially, or intermittently powered On to monitor the control channel and/or data channel.

Note that, in addition to some or all of the states illustrated in FIG. 2, an access terminal may also implement additional states.

Internal Proxy Mode

As described herein, power conservation at the access terminal 102 is achieved by switching from an established operating mode (e.g., an operating mode defined by a communication standard implemented by the access terminal) to an internal "proxy mode". Regardless of the operating modes defined by the standard being implemented or supported by an access terminal for wireless communications, the access terminal may implement the internal (power conservation) proxy mode that allows the access terminal to turn Off its baseband processor, receiver/transmitter chain, and/or other circuits, modules, and/or components while tasking a dedicated, power-efficient, proxy circuit to monitor its signaling channel (e.g., paging channel, data signaling channel, and/or control signaling channel). That is, the access terminal may include an internal, integrated, standalone, and/or dedicated proxy circuit, device, function, and/or module that the baseband processor can task with monitoring a signaling channel for the access terminal.

Figure 3:
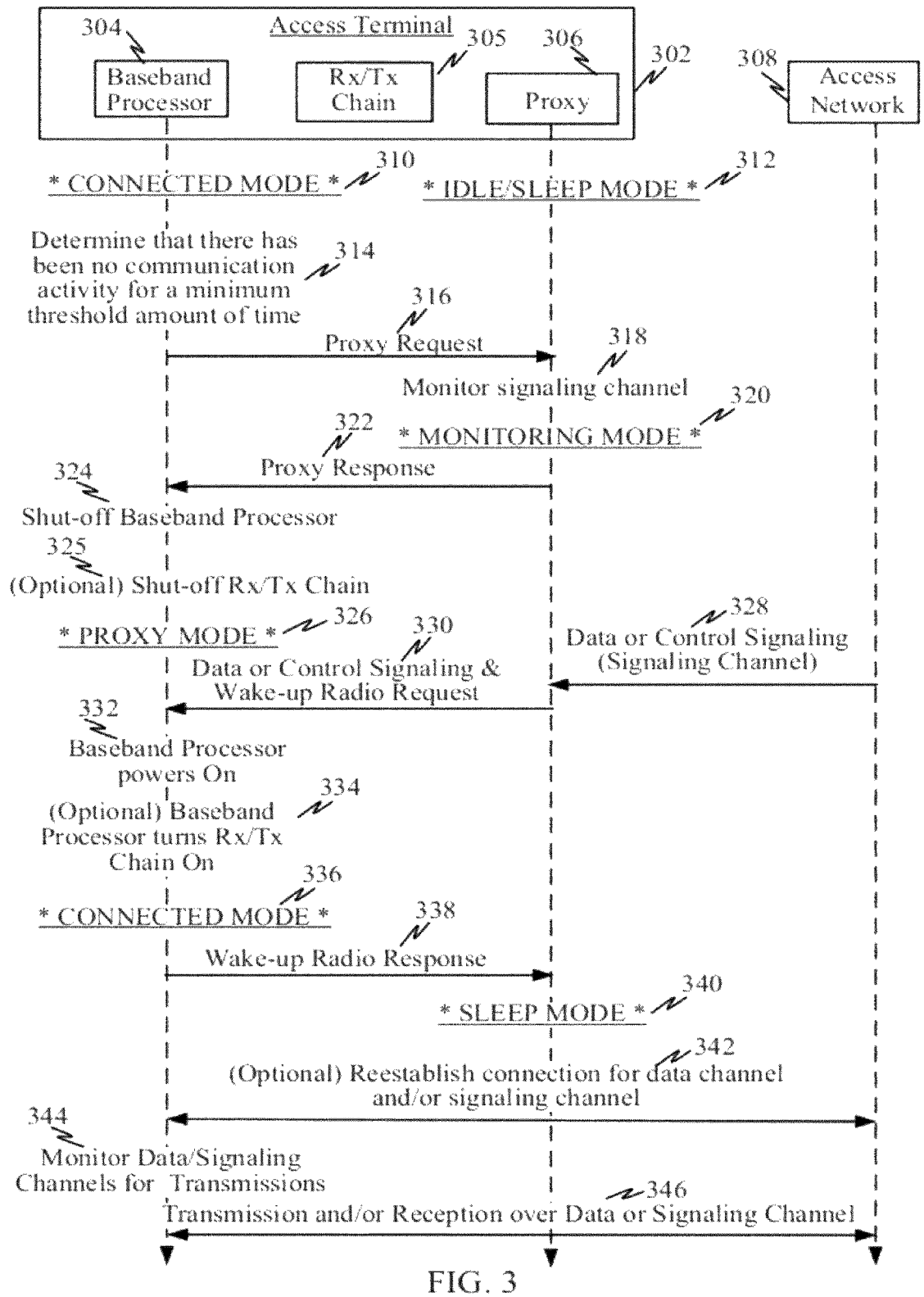
FIG. 3 is a flow diagram illustrating the operation of a wireless communication system in which an access terminal includes an internal proxy that facilitates power conservation.

FIG. 3 is a flow diagram illustrating the operation of a wireless communication system in which an access terminal includes an internal proxy that facilitates power conservation. In this example, the access terminal 302 may be in communication with an access network 308 (e.g., access node, etc.) over one or more wireless channels. The access terminal 302 may include a baseband processor 304 and receiver/transmitter chain 305 and a proxy 306. The proxy 306 may be a circuit, module, component, etc., that is a stand-alone device or integrated with another device, processor, circuit, module and/or component in the access terminal 302.

While the access terminal 302 is in a connected mode 310 (such as connected mode 204/222 or quasi-connected mode 205/231), where the baseband processor 304 and receiver/transmitter chain 305 are powered On to monitor a data channel and/or a signaling channel (e.g., paging or control channel), it may start a timer that determines when there has been no communication activity with the access node (e.g., over the control, data and/or signaling channels) for a minimum threshold amount of time 314. That is, the timer serves a power conservation function by informing the access terminal when to switch from the connected mode 310 to a proxy mode 326. If communication inactivity is detected, a proxy request 316 may be sent to the proxy 306 to monitor the signaling channel (e.g., paging, control, and/or data channel) on behalf of the access terminal. The proxy request 316 may include one or more parameters that inform the proxy 306 about the monitoring setup (e.g., channel information, etc.).

Upon receipt of the proxy request 316, the proxy 306 may switch from an idle or sleep mode 312, where it is non-operational or not monitoring any channels, to a monitoring mode 320 where it monitors the signaling channel 318. Note that, in some implementations, the proxy 306 may also monitor other channels (including data/control channels), as exemplified in FIG. 13 where various channels that may be monitored by the proxy are shown. The proxy 306 may then send a response 322 to the baseband processor 304 that causes a shut-off of the baseband processor. In implementations where the proxy 306 has its own communication circuit, the receiver/transmitter chain 305 may also be shut-off 325. Alternatively, where the proxy 306 reuses all or part of the receiver/transmitter chain 305, then the receiver/transmitter chain 305 remains (at least partially) powered On. Upon turning off the baseband processor 304 and, optionally, the receiver/transmitter chain 305, the access terminal 302 enters into a proxy mode 326 that is characterized by low-power consumption. For example, such proxy mode 326 may be an internal mode, not defined within a communication standard implemented by the access terminal 302. For instance, in addition to the operating modes illustrated in FIG. 2, the access terminal 302 may internally implement the proxy mode 326 in which the proxy 306 monitors the signaling channel (e.g., a paging, control, and/or data channel) while the baseband processor 304 and, optionally, receiver/transmitter chain 305 are turned Off. Note that in some implementations (e.g., where no data resume indicator is available from the access network 308), this change in operating modes for the baseband processor 304 and receiver/transmitter chain 305 may not be communicated to the access network 308. In an alternative implementation, e.g., where a data resume indicator is available from the access network 308, the access terminal 302 may notify the access network 308 of its change to a proxy mode.

The access network 308 (e.g., access node) may subsequently broadcast/send a data or control signaling message 328 (e.g., a page message) over the signaling channel intended for the access terminal 302. The proxy 306 may forward the data or control signaling message and/or a wake-up radio request 330 for the baseband processor 304. As a result of the wake-up radio request 330, the baseband processor 304 may be turned On 332. Similarly, if it had been turned Off, the receiver/transmitter chain 305 may also be turned On 334. Having activated the baseband processor 304 and/or receiver/transmitter chain 305, the access terminal 302 enters a connected mode 336.

Note that, to reduce the baseband processor 304 wake-up latency, rather than shutting it Off completely (at 324), the baseband processor 304 may instead be placed in a low power state. Additionally, the wake-up radio request forwarded to the baseband processor 304 can also be optimized. For example, the proxy 306 may forward packets from any of the monitored channels at a Physical (PHY) Layer, a Medium Access Control (MAC) Layer, or a Radio Resource Control (RRC) Layer. If forwarded at the PHY layer less delay is involved, hence the baseband processor 304 can respond quickly to the access network 308.

A wake-up radio response 338 may then be sent by the baseband processor 304 to the proxy 306 confirming the baseband processor is fully functional, which allows the proxy 306 to switch from monitoring mode 320 to sleep mode 340.

The access terminal 302 may optionally reestablish a connection for the data channel and/or signaling channel 342 with the access network 308. The access terminal 302 (baseband processor 304 and receiver/transmitter chain 305) may then monitor the data and/or signaling channels for transmissions 344. Thus, the access terminal 302 may receive and/or transmit over the data or signaling channels 346 from/to the access network 308.

Exemplary Access Terminals

Figure 4:
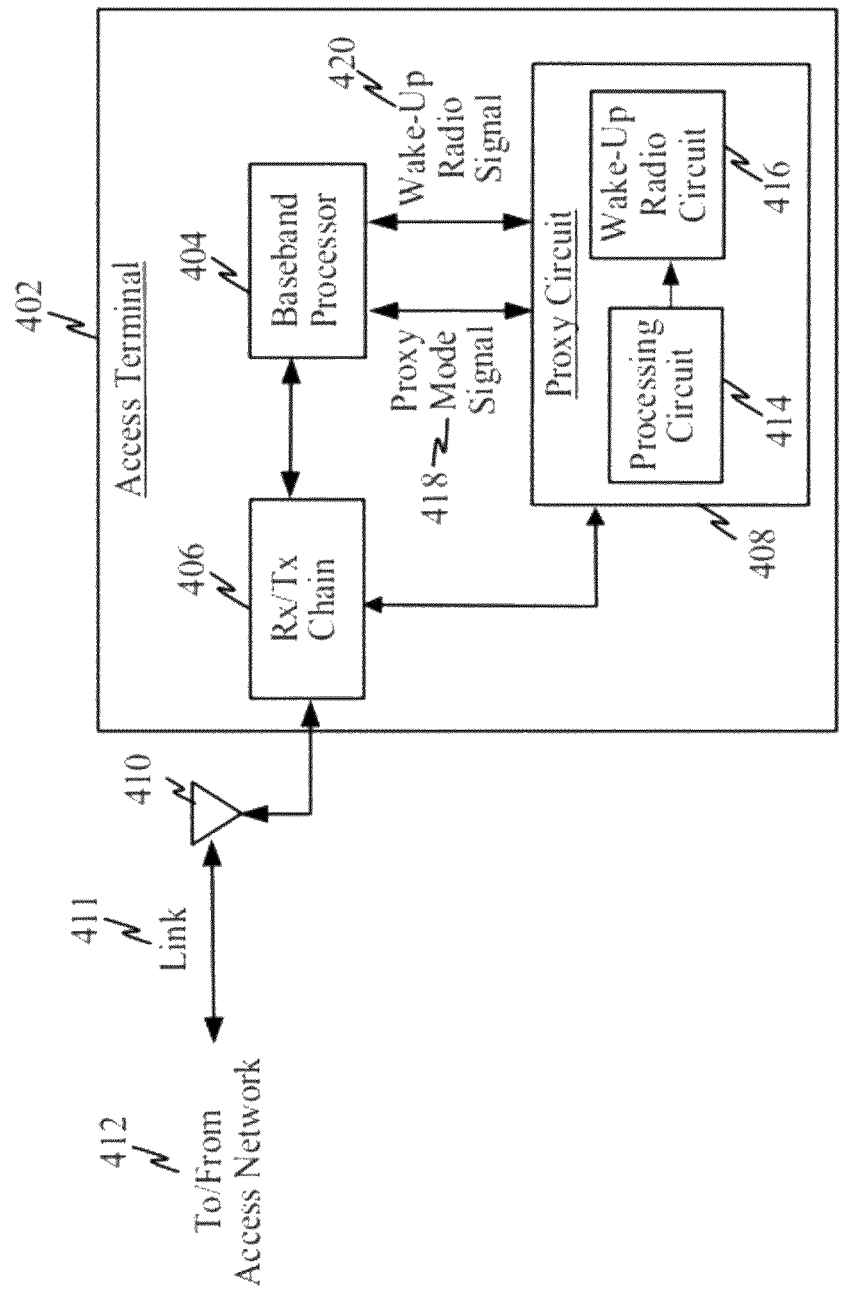
FIG. 4 is a block diagram of an example of an access terminal configured for power conservation by using an internal proxy.

FIG. 4 is a block diagram of a first example of an access terminal configured for power conservation by using an internal proxy. The access terminal 402 may include several hardware, functional, and/or logical components, including a baseband processor 404, a receiver/transmitter chain 406, and a proxy circuit 408. The baseband processor 404 may be coupled to the receiver/transmitter chain 406. The receiver/transmitter chain 406 may be coupled to an antenna 410 to facilitate wireless communications over a communication link 411 with an access network 412. The baseband processor 404 may also be coupled to a proxy circuit 408. The proxy 408 may be coupled to the antenna 410 to facilitate wireless communications with the access network 412. In this example, the proxy circuit 408 is reusing the receiver/transmitter chain 406. In one implementation, the communication link 411 may include a data channel and/or a signaling channel. The components illustrated herein may be, for example, adapted to perform some or all of the functions or steps illustrated in FIG. 3.

The access terminal 402 may be configured to enter into a proxy mode where it shuts Off the baseband processor 404 after a period of communication inactivity is detected and turns the proxy circuit 408 On to monitor a signaling (e.g., paging or control) and/or data channel on behalf of the access terminal 402. Because the proxy circuit 408 consumes significantly less power than the baseband processor 404, entering into the proxy mode saves significant power. Upon receipt of a signaling (e.g., paging or control) or data message over the communication link 411, the proxy circuit 408 causes the baseband processor 404 to power On. Thus, the access terminal 402 may resume a connected mode in which it may receive and/or transmit data over the link 411.

In some implementations, the proxy circuit 408 and baseband processor 404 may share a receiver chain to the antenna 410. That is, when not in proxy mode, the baseband processor 404 may utilize the receiver chain and/or a transmitter chain 406 for the antenna 410 so that it may communicate over the link 411. When in proxy mode, the proxy circuit 408 may utilize the receiver chain for the antenna 410. Additionally, when in proxy mode, the transmitter chain may optionally be shut Off.

Note that the proxy circuit 408 may be deployed across various different modem architectures. In one example, the proxy circuit 408 may include a processing circuit 414 and a wake-up radio circuit 416. The processing circuit 414 may serve to monitor the signaling channel, process any messages received over the receiver/transmitter chain 406, and send an indicator to the wake-up radio circuit 416 to cause the baseband processor 404 to be turned On. The proxy circuit 408 and baseband processor 404 may exchange a proxy mode signal 418 (e.g., to indicate when to enter or exit proxy mode) and a wake-up radio signal 420 (e.g., to indicate when the baseband processor should be turned On). For example, in proxy mode, the processing circuit 414 may be adapted to determine whether a received data or control signal is intended for the access terminal 402 in which the proxy circuit 408 is integrated or housed. If such data or control signal is received (e.g., indicating a call or data session or data transmissions are forthcoming), then the processing circuit 414 sends an indication to the wake-up radio circuit 416 which causes the wake-up radio circuit 416 to power On the baseband processor 404 (e.g., by the wake-up radio signal 420). Note that the baseband processor 404 may also reply back to the proxy circuit with a wake-up radio response. Additionally, the proxy circuit 408 may also forward the received data or control signal received to the baseband processor 404 after it has been powered On. For this purpose, the proxy 408 may also include a buffer to temporarily buffer the received data or control signal while the baseband processor 404 is powered back On.

Figure 5:
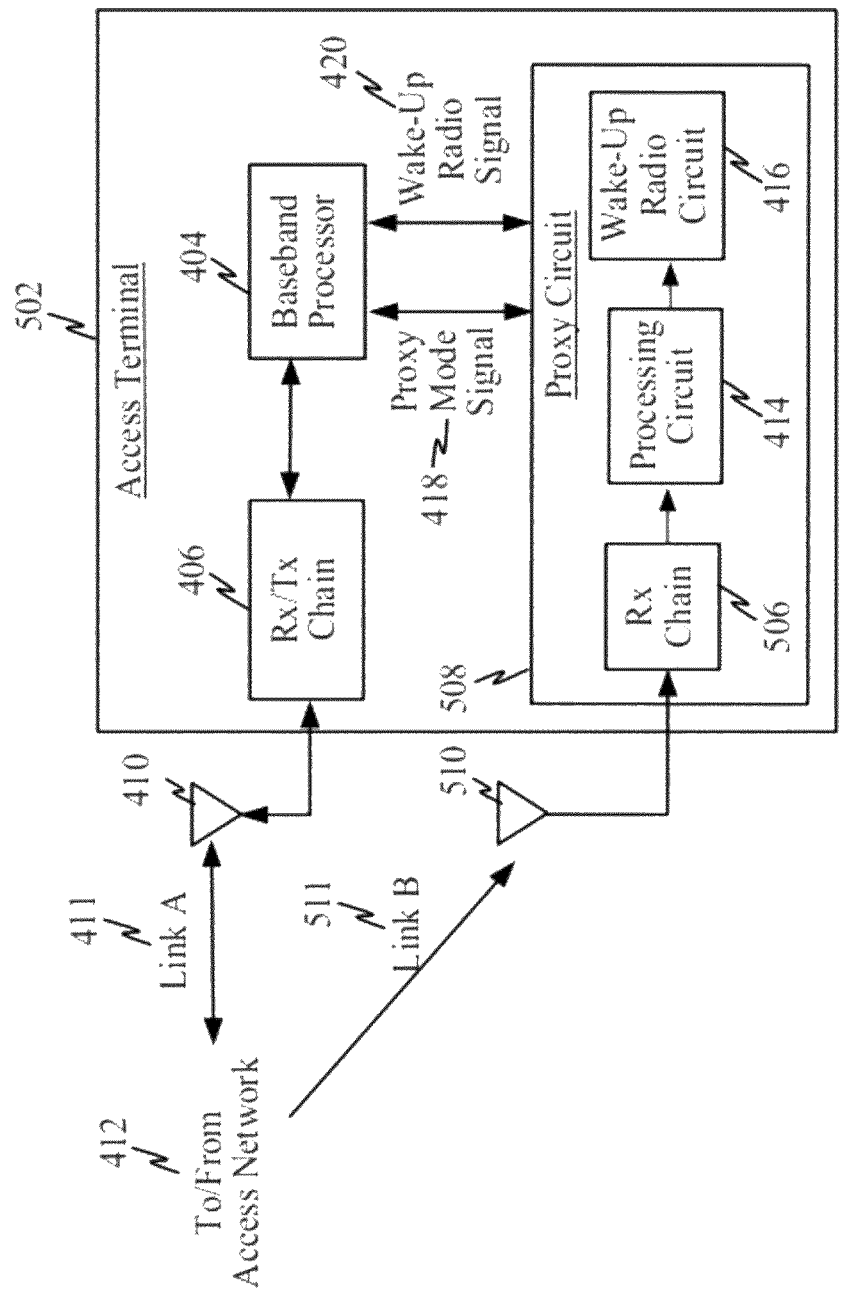
FIG. 5 is a block diagram of a second example of an access terminal configured for power conservation by using an internal proxy.

FIG. 5 is a block diagram of a second example of an access terminal configured for power conservation by using an internal proxy. As illustrated, the access terminal 502 may be a variation of the access terminal 402 in FIG. 4. In this implementation, the proxy circuit 508 may include its own receiver chain 506 (i.e., separate from the receiver/transmitter chain 406) and/or a second antenna 510. Therefore, during proxy mode, not only is the baseband processor 404 powered Off (or switched to a low-power state), but also the receiver/transmitter chain 406 can be powered Off (or switched to a low-power state). The second antenna 510 and receiver chain 506 allow the proxy circuit 508 to monitor a signaling channel over a communication link B 511 with the access network 412. During proxy mode, when a signaling (e.g., paging or control) message is received by the proxy circuit 508, the proxy circuit 508 may cause the baseband processor 404 and/or receiver/transmitter chain 406 to be powered On (or switched back to a connected state).

Note that some of the components, modules, functions, and/or circuits of the proxy circuits 408 and/or 508 may be integrated or are part of other components of an access terminal.

Exemplary Modem Architecture A

Figure 6:
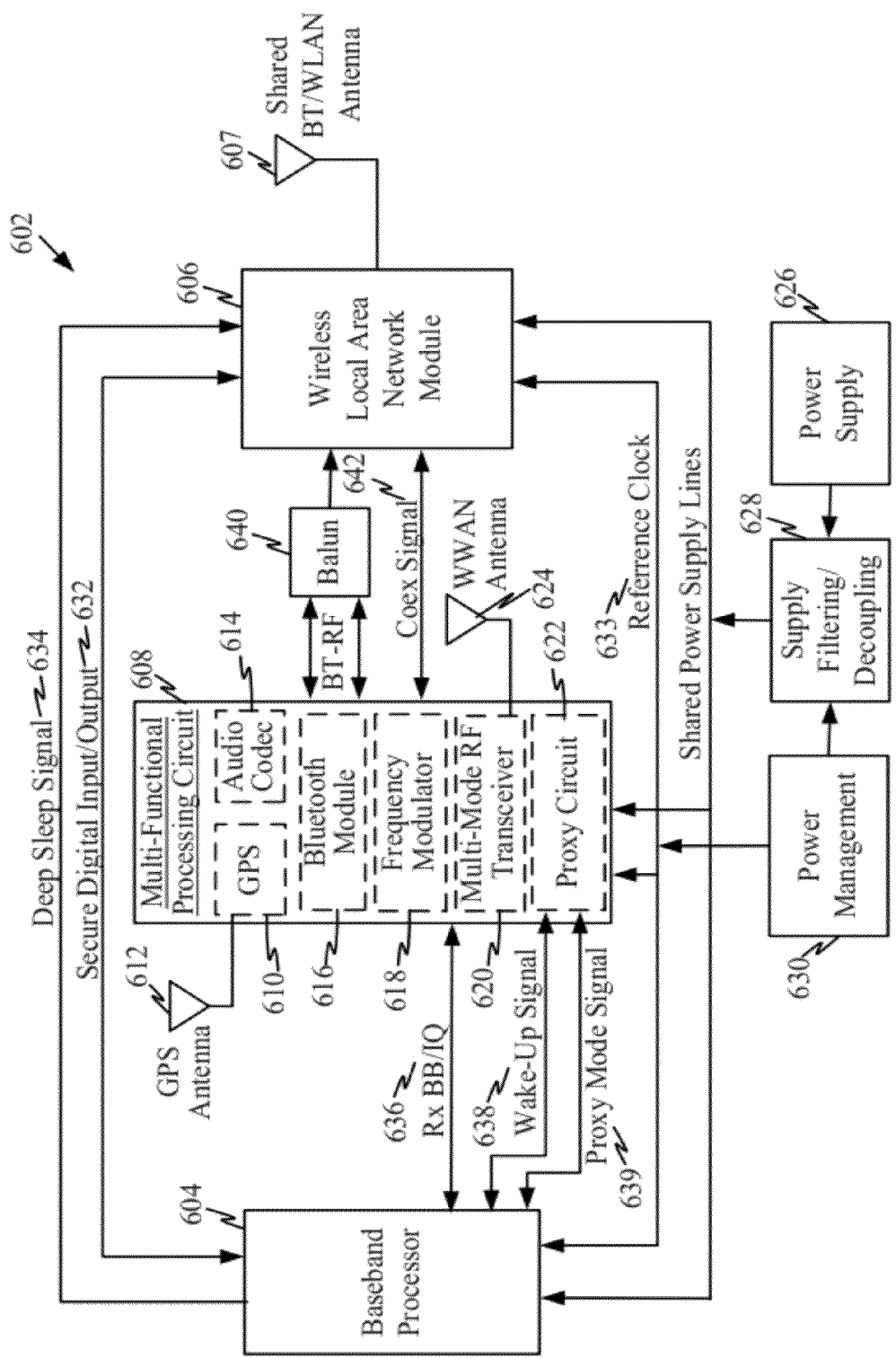
FIG. 6 illustrates a first exemplary modem architecture for an access terminal that includes a proxy component to facilitate power conservation.

FIG. 6 illustrates a first exemplary modem architecture for an access terminal that includes a proxy component to facilitate power conservation. An access terminal 602 may include a baseband processor 604, a wireless local area network (WLAN) module 606 and/or a multi-functional processing circuit 608. A power supply 626 may power the baseband processor 604, wireless local area network module 606 and/or multi-functional processing circuit 608 via a power supply filtering/decoupling circuit 628 according to controls from a power management module 630. Additionally, a reference clock 633 may be provided to the baseband processor 604, wireless local area network module 606 and/or multi-functional processing circuit 608 so their communications may be synchronized. The baseband processor 604 may communicate data to/from the WLAN module 606 via a secure digital input/output interface 632. In turn, the WLAN module 606 may communicate with an access network via a shared antenna 607. Additionally, the baseband processor 604 may be capable of sending a deep sleep signal 634 to the WLAN module 606 to cause the WLAN module 606 to enter into a sleep mode (e.g., to power Off). The baseband processor 604 may also communicate with the multi-functional processing circuit 608 to receive baseband (BB) in-phase and quadrature-phase (IQ) signals 636.

The multi-functional processing circuit 608 may include multiple circuits or modules, such as a Global Positioning System (GPS) module 610 coupled to a GPS antenna 612, an audio codec 614, a Bluetooth module 616, a frequency modulator 618, a proxy module or circuit 622, and a multi-mode radio frequency (RF) transceiver 620 coupled to a wireless wide area network (WWAN) antenna 624. In this exemplary implementation, the proxy circuit 622 may share the multi-mode RF transceiver 620 with the baseband processor 604.

When the access terminal is in proxy mode, the baseband processor 604 may be powered Off but the multi-mode radio frequency (RF) transceiver 620 remains powered On and is reused by the proxy circuit 622. The proxy circuit 622 may be a circuit that is specifically adapted to monitor a paging or control channel and wake-up the baseband processor 604 when a paging message is received. Due to its specific purpose and operation, the proxy circuit 622 may be relatively power efficient (e.g., at least in comparison to power consumption of the baseband processor 604). The multi-functional processing circuit 608 may provide Bluetooth and/or radio frequency (RF) signals via a baleen 640 (e.g., unbalanced-to-balanced transformer) to the WLAN module 606. To minimize interference between different radio technologies (e.g., Bluetooth Module 616 and WLAN Module 606), a coexistence signal 642 may be used to coordinate the operation of each radio technology (e.g., to avoid collisions in the transmission mediums).

During operation, the access terminal 602 may ascertain if the baseband processor 604 and/or WLAN module 606 have been inactive (e.g., no communication is received or sent) for more than a threshold amount of time. If so, the access terminal 602 may switch from a connected mode, where the baseband processor 604 and WLAN module 606 are substantially, continuously, or fully powered On, to an internal proxy mode, where the baseband processor 604 is substantially or fully powered Off. In some instances, the operating state (e.g., connected mode, idle mode, or sleep mode) of the access terminal 602 is known to the access network. However, to conserve power, the access terminal 602 may implement an internal operating mode (i.e., proxy mode) that may be transparent to or not known by the access network. Alternatively, where a data resume indicator is available from the access network, the access terminal 602 may provide its change of operating mode (e.g., from a connected mode to the proxy mode) to the access network.

When seeking to switch to proxy mode, the baseband processor 604 may send a proxy mode signal 639 to the proxy circuit 622 requesting that it act as a proxy to monitor its paging or control channel while the baseband processor 604 and/or WLAN Module 606 are shut Off. Thus, the proxy circuit 622 may become activated and may optionally send a response to the baseband processor 604 indicating that its proxy request is accepted. Once the proxy circuit 622 is activated, it monitors a paging or control channel for signaling messages to the access terminal 602. Upon receipt of a signaling message (e.g., a paging or control message), the proxy circuit 622 may send a wake-up signal 638 to the baseband processor 604 indicating it should wake-up to receive information on the data channel. Consequently, the baseband processor 604 turns On and may also cause the WLAN module 606 to turn On. Once both the baseband processor 604 and the WLAN module 606 are powered On, the access terminal 602 may enter into a connected mode in which it monitors the data channel for incoming data transmissions. Upon entering the connected mode, the proxy circuit 622 may be idled.

Note that, in alternative implementations where the proxy circuit includes its own receiver and/or transmitter chain (e.g., as illustrated in FIG. 5), the antenna 624 may be coupled to the proxy circuit 622. This may allow more circuits or modules in the multi-functional processing circuit to be powered Off during proxy mode.

Exemplary Modem Architecture B

Figure 7:
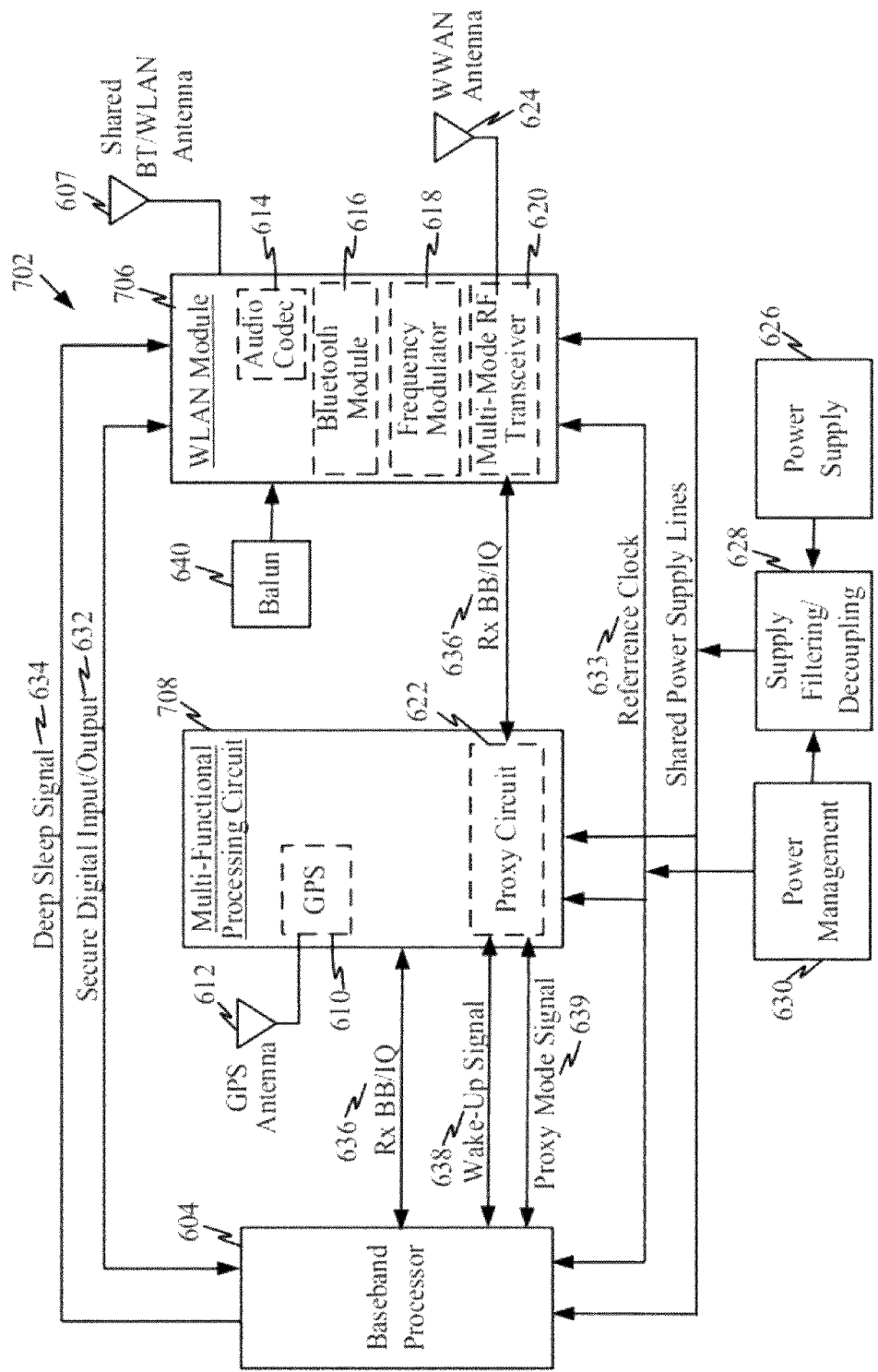
FIG. 7 illustrates a second exemplary modem architecture for an access terminal that includes a proxy component to facilitate power conservation.

FIG. 7 illustrates a second exemplary modem architecture for an access terminal that includes a proxy component to facilitate power conservation. The access terminal 702 may be similar to that described in FIG. 6, but the WLAN module 706 and multi-functional processing circuit 708 are distinct from the corresponding the WLAN module 606 and multi-functional processing circuit 608. In particular, some of the functionality, circuits, and/or modules from the multi-functional processing circuit 608 have been moved into the WLAN module 706. For instance, the audio codec 614, Bluetooth module 616, frequency modulator 618, and/or multi-mode RF transceiver 620 may be part of the WLAN module 706. Consequently, the multi-functional processing circuit 708 may include, for example, the GPS module 610 and the proxy circuit 622. The proxy circuit 622 may be communicatively coupled to the multi-mode RF transceiver 620 to receive and/or send signals via the WWAN antenna 624 during proxy mode. Aside from this structural difference, the access terminal 702 may operate similar to access terminal 602 of FIG. 6 by implementing power conservation using an internal proxy mode that relies on the proxy circuit 622 to listen for data or control signaling on a paging channel while the baseband processor 604 is turned Off. Note that as compared to the access terminal 602 of FIG. 6, the WLAN module 706 is powered on during proxy mode because the Multi-Mode RF Transceiver 620 is imbedded in the WLAN module 706. For power saving purposes, in this implementation the WLAN Module 706 may be adapted to permit some circuits or modules (e.g., GPS module 610, audio codec 614, Bluetooth module 616 and/or Frequency modulator 618) to be powered Off while permitting the multi-mode RF transceiver 620 to stay powered On during proxy mode operation of the baseband processor 604 and/or WLAN module 706.

Exemplary Modem Architecture C

Figure 8:
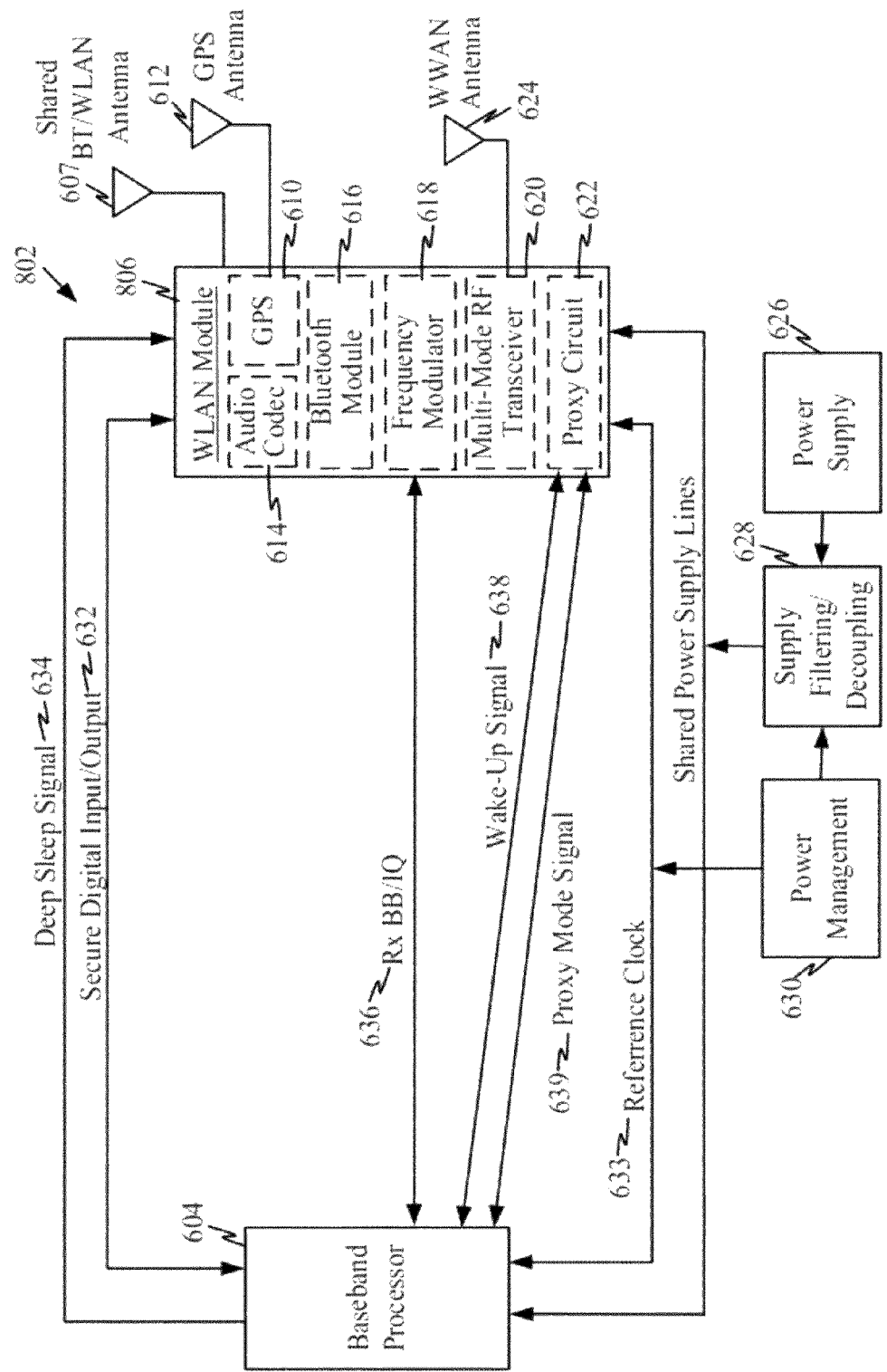
FIG. 8 illustrates a third exemplary modem architecture for an access terminal that includes a proxy component to facilitate power conservation.

FIG. 8 illustrates a third exemplary modem architecture for an access terminal that includes a proxy component to facilitate power conservation. The access terminal 802 may be similar to that described in FIG. 6, but some or all of the functionality, circuits, and/or modules from the multi-functional processing circuit 608 have been moved into the WLAN module 806. For instance, the GPS module 610, audio codec 614, Bluetooth module 616, frequency modulator 618, multi-mode RF transceiver 620, and/or proxy circuit 622 may be part of the WLAN module 806.

Note that, in this implementation of the WLAN Module 806 may incorporate the proxy circuit 622 but may be adapted to permit some circuits or modules (e.g., GPS module 610, audio codec 614, Bluetooth module 616, and/or Frequency modulator 618) to be powered Off while permitting the proxy circuit 622 and the multi-mode RF transceiver 620 to stay powered On during proxy mode operation of the baseband processor 604 and/or WLAN module 806.

Exemplary Method for Internal Proxy Mode Operation in Access Terminal

Figure 9:
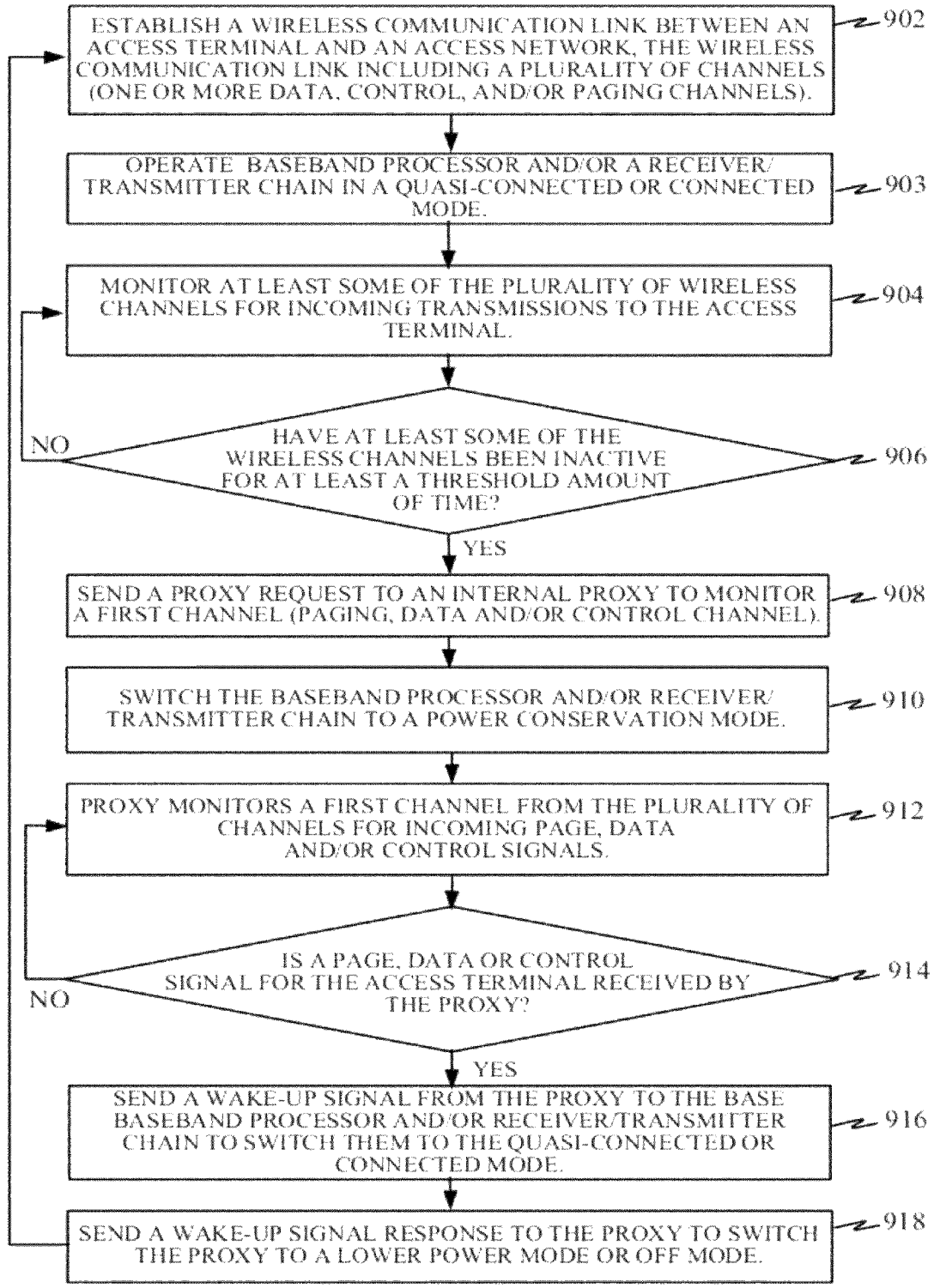
FIG. 9 is flow diagram illustrating a method operational in an access terminal for conserving power by utilizing an internal proxy mode.

FIG. 9 is flow diagram illustrating a method operational in an access terminal for conserving power by utilizing an internal proxy mode. Note that this method may be implemented on all or some of the access terminals disclosed. A wireless communication link may be established between an access terminal and an access network, where the wireless communication link may include a plurality of wireless channels (e.g., one or more data, control, and/or paging channels) 902. The baseband processor and/or a receiver/transmitter chain (e.g., of the access terminal) may be operated in a quasi-connected or connected mode 903. For example, the receiver/transmitter chain and/or baseband processor may be used to monitor one or more data, control and/or paging channels. The access terminal (e.g., via a receiver/transmitter chain and/or baseband processor) may then monitor at least some of the plurality of wireless channels for incoming transmissions to the access terminal 904. The access terminal may then determine whether at least some of the wireless channels have been inactive for at least a threshold amount of time 906. If not, then it continues monitoring at least some of the plurality of wireless channels 904. Otherwise, the access terminal (e.g., baseband processor) may enter into a power saving proxy mode. For instance, the access terminal (e.g., baseband processor) requests an internal proxy to monitor a first channel (e.g., paging, data, and/or control channel) 908. The baseband processor and/or receiver/transmitter chain (or at least some components therein) are then switched to a power conservation mode (e.g., a low power mode or an off mode) 910. The proxy then monitors the first channel from the plurality of channels for incoming page, data and/or control signals 912. If a page, data and/or control signal is received for the access terminal by the proxy 914, then the proxy may send a wake-up radio signal to cause the base baseband processor and/or receiver/transmitter chain to switch to the quasi-connected or connected mode 916. The access terminal may also send back a wake-up signal response to the proxy to cause the proxy to switch to a lower power mode/state or an off mode/state 918. The access terminal may then reestablish the wireless communication link with the access network 902 and monitors incoming transmissions 904 from the access node and/or transmits data to the access node.

Exemplary Implementation of Proxy Mode from a UMTS CELL_FACH Connected State Without Data Resume Indicator FIGS. 10-13 illustrate examples of a proxy that may be implemented when no data resume indicator is available from the access network. Such data resume indicator (DRI) may be provided by the access network (e.g., access node) in some implementations to inform the access terminal when data messages will be sent, thereby allowing the access terminal, for example, to switch from the proxy mode to the connected mode in time to receive data/control/page directly from the network.

Figure 10:
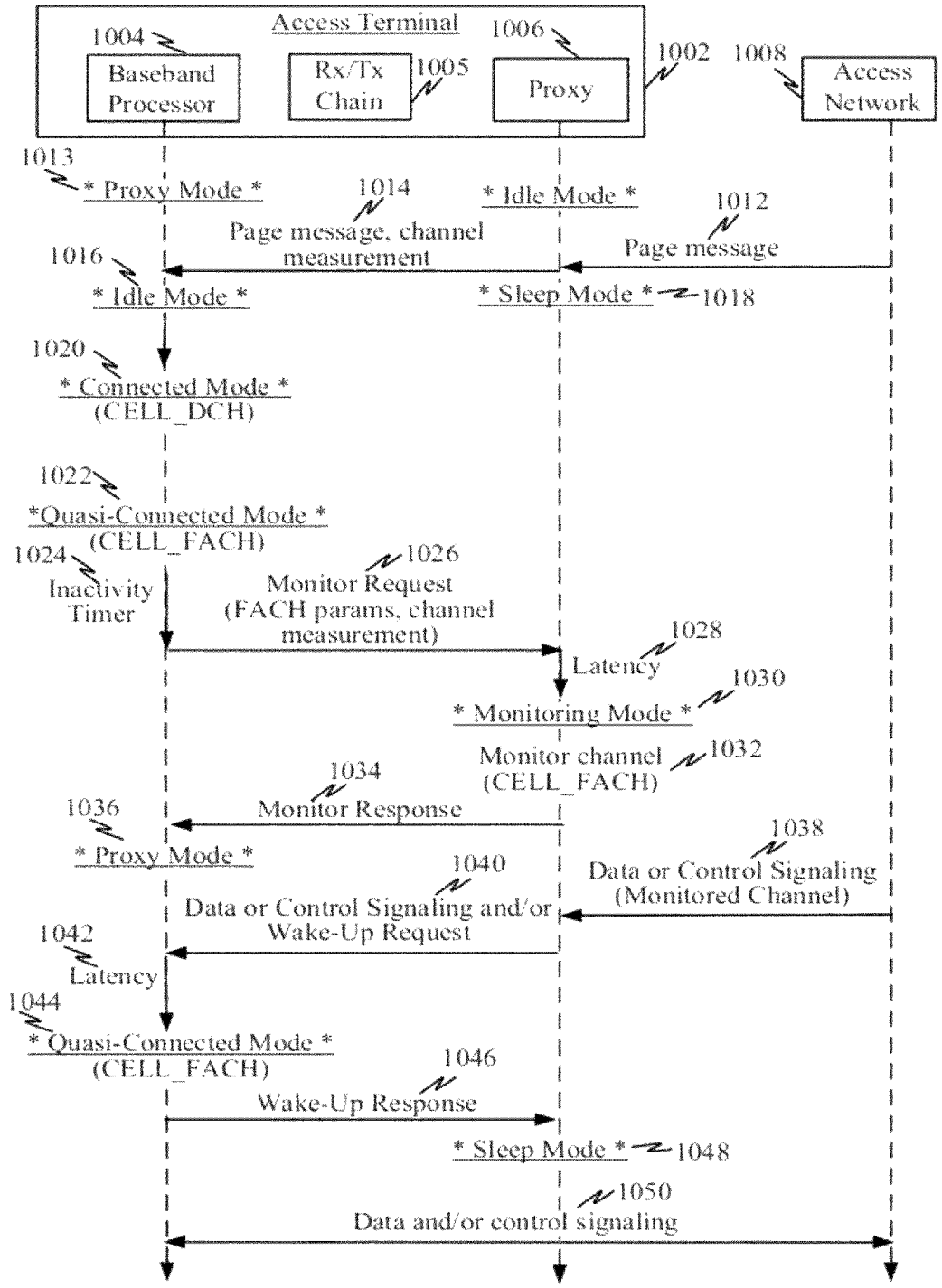
FIG. 10 is a flow diagram illustrating the operation of a wireless communication system in which an access terminal includes an internal proxy that facilitates power conservation.

FIG. 10 is a flow diagram illustrating the operation of a wireless communication system in which an access terminal includes an internal proxy that facilitates power conservation. This example illustrates one possible implementation of an internal proxy mode for an access terminal 1002 that may include a wireless interface implementing, for example, Radio Resource Control (RRC) according to Universal Mobile Telecommunications System (UMTS) Wideband Code Division Multiple Access (W-CDMA). The access terminal 1002 may be in communication with an access network 1008 (e.g., access node, etc.) over one or more wireless channels. The access terminal 1002 may include, for example, a baseband processor 1004 and receiver/transmitter chain 1005 and a proxy 1006. The receiver/transmitter chain 1005 may be, for example as illustrated in FIG. 4 (Rx/Tx Chain 406) or as illustrated in FIG. 5 (Rx/Tx chain 406).

Upon startup, the proxy 1006 may monitor a paging channel for a paging message 1012 on behalf of the access terminal 1002 while the baseband processor 1004 is in a proxy mode 1013. When a page message is received by the proxy 1006, the proxy 1006 forwards the page message and/or channel measurements 1014 (to expedite future connections between the access terminal 1002 and access network 1008) to the baseband processor 1004. Upon reception of the page message, the baseband processor 1004 and/or receiver/transmitter chain 1005 may be placed into Idle Mode 1016 while the proxy 1006 may be placed into a Sleep Mode 1018. The baseband processor 1004 and/or receiver/transmitter chain 1005 may then change operating modes to a Connected Mode 1020 (RRC state—CELL_DCH) to accept a terminated call or to originate a call, and eventually into just a Quasi-Connected Mode 1022 (RRC state—CELL_FACH). When in the quasi-connected mode 1022 (CELL_FACH), the access terminal 1002 may maintain an inactivity timer 1024 that determines when no communication activity has occurred for a minimum time threshold. That is, if no communication activity is detected in a paging, control, and/or data channel (link 411 in FIG. 4), then the baseband processor 1004 may send a Monitor Request 1026 (e.g., including one or more channel parameters) to the proxy 1006. After a potential latency period 1028 (i.e., due to powering of circuits and/or configuration to an appropriate access terminal operating state), the proxy 1006 may enter into a Monitoring Mode 1030, in which it monitors the paging, data, and/or control channel 1032, and may send a Monitor Response 1034 back to the baseband processor 1004. Upon receipt of the response 1034, the baseband processor 1004 may enter into an internally defined Proxy Mode 1036 in which the baseband processor 1004 is completely or substantially powered Off (e.g., or a lower power operating state). In implementations where the proxy reuses the receiver/transmitter chain 1005, the receiver/transmitter chain 1005 may be fully or partially On. Alternatively, if the proxy 1006 has its own dedicated receiver/transmitter chain, then the receiver/transmitter chain 1005 is also powered Off during proxy mode, and/or back on during quasi-connected mode 1044 (CELL_FACH).

Subsequently, when the access network 1008 sends a data or control signal over the monitored channel 1038, the proxy 1006 may recognize this as an event to wake-up the baseband processor 1004. The proxy 1006 may send the received data or control signal and/or a wake-up request 1040 to the baseband processor 1004. Note that, in some instances, the transmission of the data or control signal from the proxy 1006 to the baseband processor 1004 (while in proxy mode) may be sufficient to indicate to the baseband processor 1004 that it should wake up or turn On to monitor its paging channel and/or data channel. Upon receipt of the wake-up request 1040, and after a possible latency period 1042 (e.g., to power on circuits), the baseband processor 1004 and receiver/transmitter chain 1005 may be powered On and in Quasi-Connected Mode (CELL_FACH state) 1044. The baseband processor 1004 may send a wake-up response 1046 to the proxy 1006, which allows the proxy 1006 to enter into a Sleep Mode 1048. The baseband processor 1004 and/or receiver/transmitter chain 1005 may then monitor the data channel and/or paging channel for data messages and/or data and/or control signaling 1050 directly from the data channel and/or paging channel, respectively.

Figure 11:
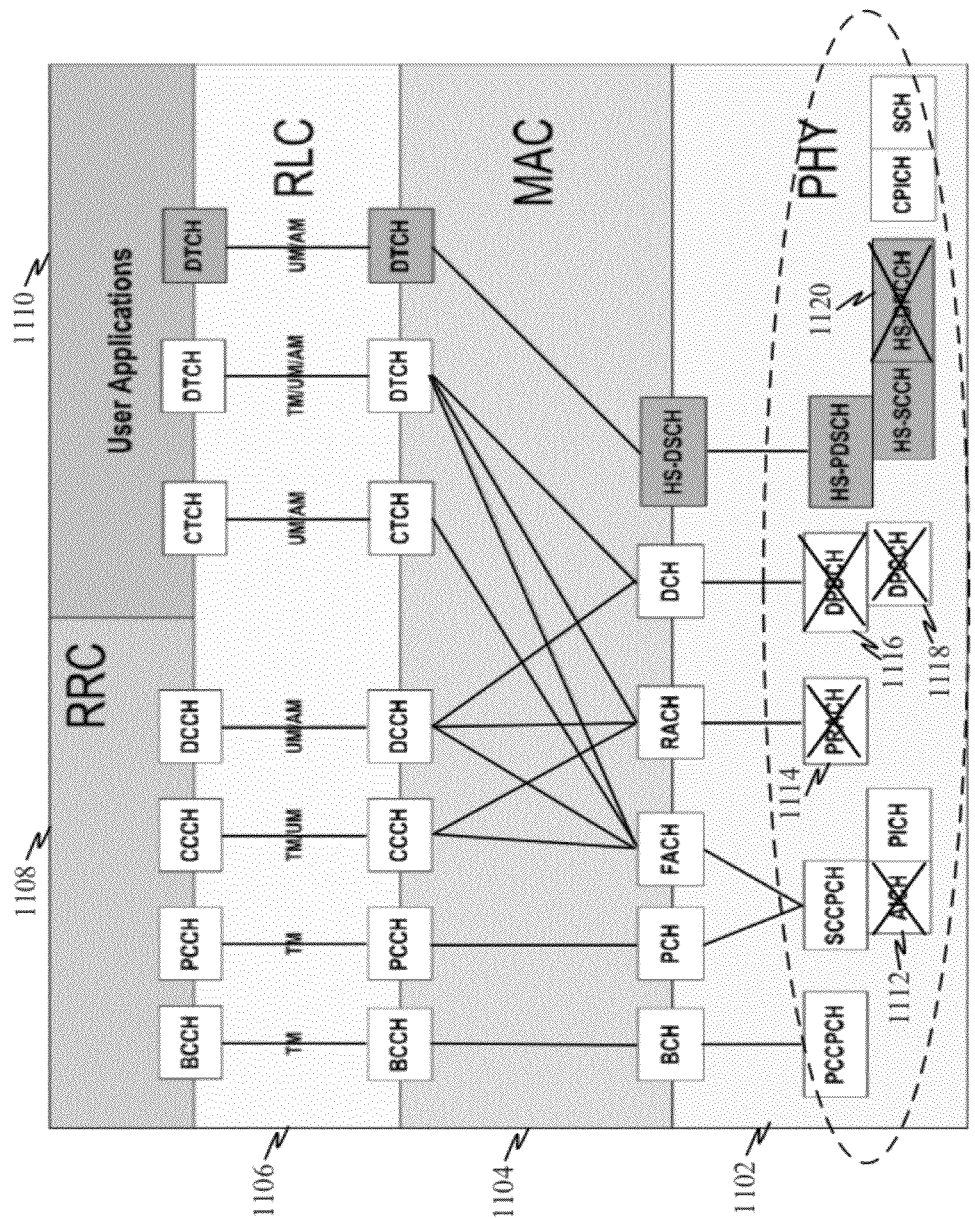
FIG. 11 illustrates channel layers across a protocol stack that may be implemented within an access terminal.

FIG. 11 illustrates channel layers across a protocol stack that may be implemented within an access terminal. In this example, the protocol stack may include a Physical (PHY) Layer 1102, a Medium Access Control (MAC) Layer 1104, a Radio Link Control (RLC) Layer 1106, a Radio Resource Control (RRC) Layer 1108, and Application (APP) Layer 1110. This structure illustrates one example of which channels in the Physical Layer 1102 may be disabled during proxy mode operation of an access terminal and therefore, the functionalities for those channels need not be included in the proxy circuit. For example, the Acquisition Indicator Channel (AICH) 1112, Physical Random Access Channel (PRACH) 1114, Dedicated Physical Data Channel (DPDCH) 1116, Dedicated Physical Control Channel (DPCCH) 1118, and/or High-Speed Dedicated Physical Control Channel (HS-DPCCH) 1120 may be disabled (e.g., corresponding circuits or chains may not be implemented). Because the data channel and/or reverse channel(s) (e.g., from the access terminal 1002 to the access network 1008) are not being used during proxy mode, these channels and components/circuits associated with these channels may be powered Off during proxy mode and need not be supported by the proxy 1006. Consequently, the proxy 1006 may simply support some or all of the remaining (forward/downlink) channels in the physical layer for proxy operation.

Figure 12:
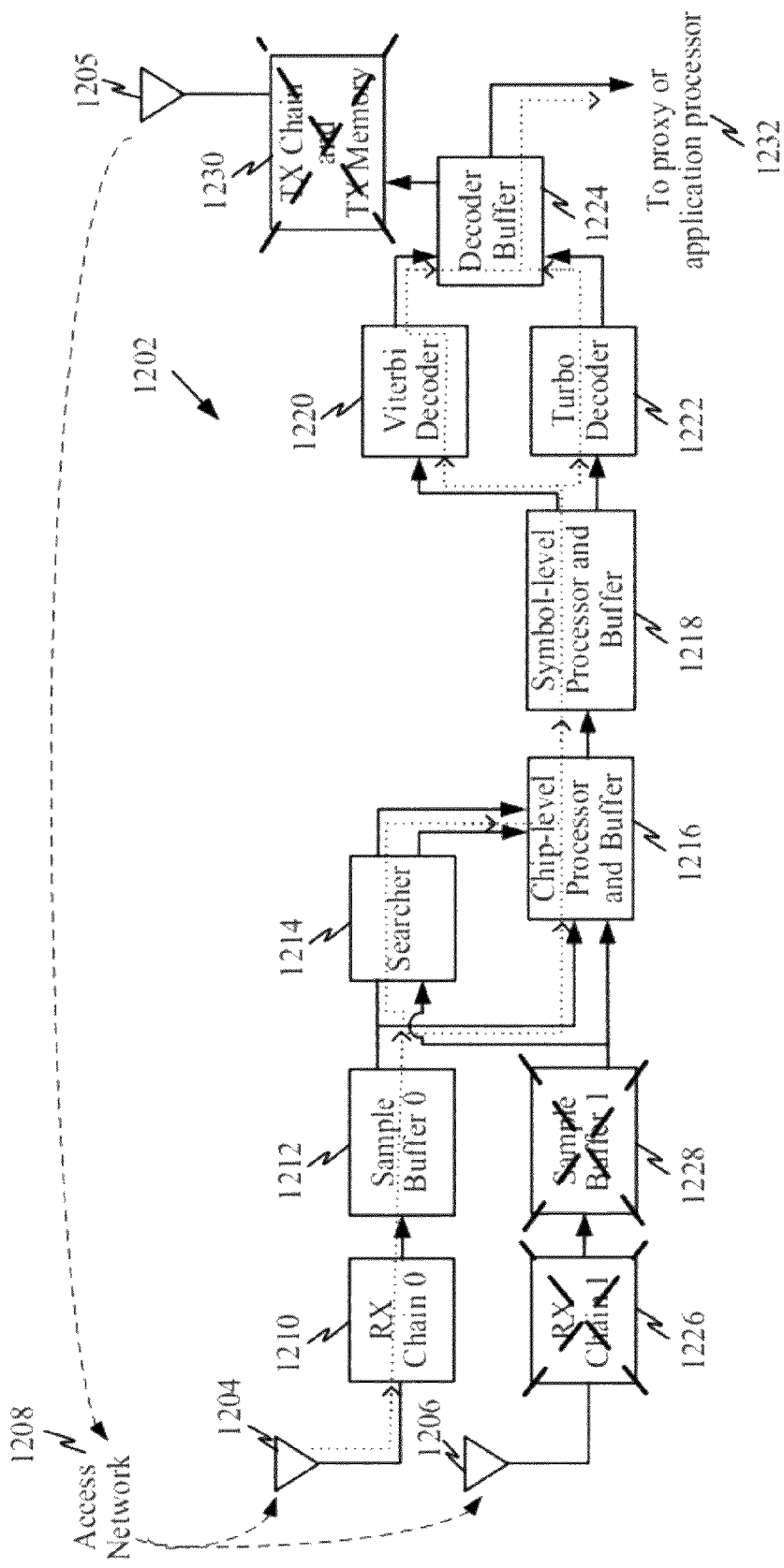
FIG. 12 is a block diagram illustrating how a typical modem architecture may be modified to function and/or operation as a proxy.

FIG. 12 is a block diagram illustrating how a typical modem architecture may be modified to function and/or operation as a proxy. In this example, the proxy may be adapted to operate or monitor one or more channels of a wireless wide area network (WWAN). The typical modem architecture may include a plurality of diversity receivers for a WWAN interface to receive transmissions from an access network 1208. For example, the typical modem architecture may include a first receive antenna 1204 coupled to a first receive chain 1210, and coupled to a first sample buffer 1212 as well as a second receive antenna 1206, coupled to a second receive chain 1226, and coupled to a second sample buffer 1228. Additionally, the modem architecture may also include a first transmit antenna 1205 to transmit to the access network 1208.

However, because the proxy has a specific and limited functionality, the modified modem architecture 1202 may cancel, disable, and/or exclude all but one receiver chain and may exclude all transmitter chains. For example, just the first receive antenna 1204, first receive chain 1210, and first sample buffer 1212 may remain. Therefore, signals received at the first receive antenna 1204, and passing through the first receive chain 1210 and first sample buffer 1212, may then be processed by a searcher 1214 and a chip-level processor and buffer 1216 and then a symbol-level processor and buffer 1218. Subsequently, a Viterbi decoder 1220 and/or Turbo decoder 1222 process the output from the symbol-level processor and buffer 1218 before passing the decoded symbols to a decoder buffer 1224. The decoded signal may then be passed to a radio wake-up circuit or an application processor 1232.

The modified modem architecture 1202 used by the proxy may serve to monitor a control, data, and/or paging channel while other receiver/transmitter chains and/or baseband processor components are turned Off or powered Off. For instance, if an access terminal enters proxy mode where the dedicated internal proxy (including the modified modem architecture 1202) monitors a control, data, and/or paging channel on behalf of the access terminal, other receiver chains and/or transmitter chains and the primary baseband processor may be turned Off since they are not needed. The trade off in adding the proxy (including its modified modem architecture 1202) is that additional components are added to the access terminal but these components operate at lower power than the baseband processor, so power is conserved. Additionally, because the modified modem architecture 1202 is limited to monitoring for data/control signaling over a control, data, and/or paging channel, the sample buffer 1212 and/or other buffers may be smaller relative to corresponding buffers used by the baseband processor which has to accommodate transmissions over a data channel.

FIG. 13 is a table illustrating various possible implementation scenarios in which a proxy may monitor one or more channels according to the requirement of one or more operating states for the access terminal. For example, in Scenario 1 the proxy may monitor various physical layer channels according to an Idle mode for the access terminal, including the Primary Synchronization Channel (P-SCH)/Secondary Synchronization Channel (S-SCH), Common Pilot Channel (CPCH), Primary Common Control Physical Channel (P-CCPCH), Secondary Common Control Physical Channel (S-CCPCH), and Paging Indicator Channel (PICH) as defined, for example, in UMTS Standard Release 1999 (R '99) and amended through pre Release 2007 (Rel. 7). That is, the proxy may monitor the physical layer channels that would have been normally monitored by the primary receiver chain and baseband processor when in Idle mode. Referring to the modem architecture of FIG. 12, Scenario 1 illustrates an example where the access terminal is in Idle mode before requesting proxying operations (e.g., entering into proxy mode). The modified modem architecture for the proxy does not require the Transmitter or Transmit Memory 1230, Turbo Decoder 1222, Receiver Chain 1 1226, and/or Sample Buffer 1 1228, so these components can be excluded from the proxy.

In Scenario 2, where the access terminal is either in the idle or CELL_FACH state before requesting proxying operations, the proxy may monitor various physical layer channels according to an Idle mode and/or CELL_FACH mode for the access terminal, including the P-SCH/S-SCH, CPCH, P-CCPCH, S-CCPCH, and PICH channels, as defined, for example, in UMTS Standard R '99 and amended through pre Rel. 7. That is, the proxy may monitor the physical layer channels that would have been normally monitored by the primary receiver chain and baseband processor when in Idle mode and/or CELL_FACH mode. The chip-level processor may implement a rake receiver while the symbol-level processor may implements a UMTS Standard Release '99 rate matching and interleaving only because high data rate channels such as the ones required in the CELL_DCH state are not supported. Referring to the modem architecture of FIG. 12, Scenario 2 does not require the Transmitter or Transmit Memory 1230, Receiver Chain 1 1226, and/or Sample Buffer 1 1228, so these components can be excluded from the proxy.

In Scenario 3, before requesting proxying operations, the access terminal is either in the idle or CELL_FACH state using High speed (HS) channels. The proxy may monitor various physical layer channels according to an Idle mode and/or CELL_FACH state with High Speed (HS) channels for the access terminal, including the P-SCH/S-SCH, CPCH, P-CCPCH, S-CCPCH, PICH, High Speed (HS) Shared Control Channel (SCCH), High Speed-Physical Downlink Shared Channel (HS-PDSCH) channels, as defined, for example, in UMTS Standard R '99 and amended through Rel. 7 and later. That is, the proxy may monitor the physical layer channels that would have been normally monitored by the primary receiver chain and baseband processor when in Idle state and/or CELL_FACH state with High Speed channels. Referring to the modem architecture of FIG. 12, Scenario 2 does not require the Transmitter or Transmit Memory 1230, Receiver Chain 1 1226, and/or Sample Buffer 1 1228, so these components can be excluded from the proxy. To support the HS channel detection, an equalizer might be used in the chip-level processor where HSDPA rate matching functionality is also required in the symbol-level processor. Despite these functionalities, the chip-level and symbol-level processors can still be streamlined and designed to be smaller and more power efficient than modems that support high data rate channels used in the CELL_DCH state.

In order for the proxy to identify when a particular data or control signal is intended for the access terminal, it may perform such identification based on the operating mode for which it monitors. For example, when the proxy performs channel monitoring according to an Idle mode for the access terminal (e.g., as in Scenarios 1, 2, or 3), it may identify whether a data/control signal from the access terminal in the signaling channel is for its access terminal by identifying information at the RRC layer (e.g., RRC Layer 1108 in FIG. 11). The packet may be carried over the Broadcast Control Channel (BCCH) and/or Paging Control Channel (PCCH). Similarly, when the proxy performs channel monitoring for an access terminal in the CELL_FACH state (e.g., as in Scenarios 2 or 3), the identification can be categorized in to two groups based on the Physical layer channel (e.g., Physical Layer 1102 in FIG. 11) used in transmission i.e. the High Speed-Physical Downlink Shared Channel (HS-PDSCH) or Secondary Common Control Physical Channel (S-CCPCH).

The first category involves when page, data or control information is received on the HS-DPSCH, the identity of the access terminal is encoded in the associated control channel (e.g., the High Speed Shared Control Channel (HS-SCCH)). The type of the access terminal identity encoded in the HS-SCCH depends on the logical channel that was used in carrying the information. For instance, the HS-SCCH packet may be masked with a BCCH specific HS-DSCH Radio Network Identifier (H-RNTI) for Broadcast Control Channel (BCCH) data, a common HRNTI is used for the Common Control Channel (CCCH), or a dedicated H-RNTI for the Dedicated Control Channel (DCCH)/Dedicated Traffic Channel (DTCH).

The second category involves using the S-CCPCH channel as the physical channel. For this category, the access terminal identification is not possible at the Physical layer like the HS channels, instead, the identification is made at the MAC or RRC layer depending on the logical channels that carried the packet. For packets sent through the DCCH or DTCH channels, the access terminal identification occurs at the MAC Layer (e.g., MAC Layer 1104 in FIG. 11) by using a packet header that identifies, for example, the UTRAN network temporary identity (URNTI) for the access terminal. For packets sent through the BCCH or CCCH channels, the access terminal identification occurs at the RRC layer (e.g., RRC layer 1108 in FIG. 11) using the access terminal's International Mobile Subscriber Identity (IMSI).

Exemplary Implementation of Proxy Mode from a UMTS CELL_FACH Connected State Using Data Resume Indicator FIGS. 14-17 illustrate examples of a proxy that may be implemented when a data resume indicator is available from the access network. Such data resume indicator (DRI) may be provided by the access network (e.g., via an access node) to inform the access terminal when data messages will be sent, thereby allowing the access terminal, for example, to switch from a proxy mode to a connected mode in time to monitor the data channel.

Figure 14:
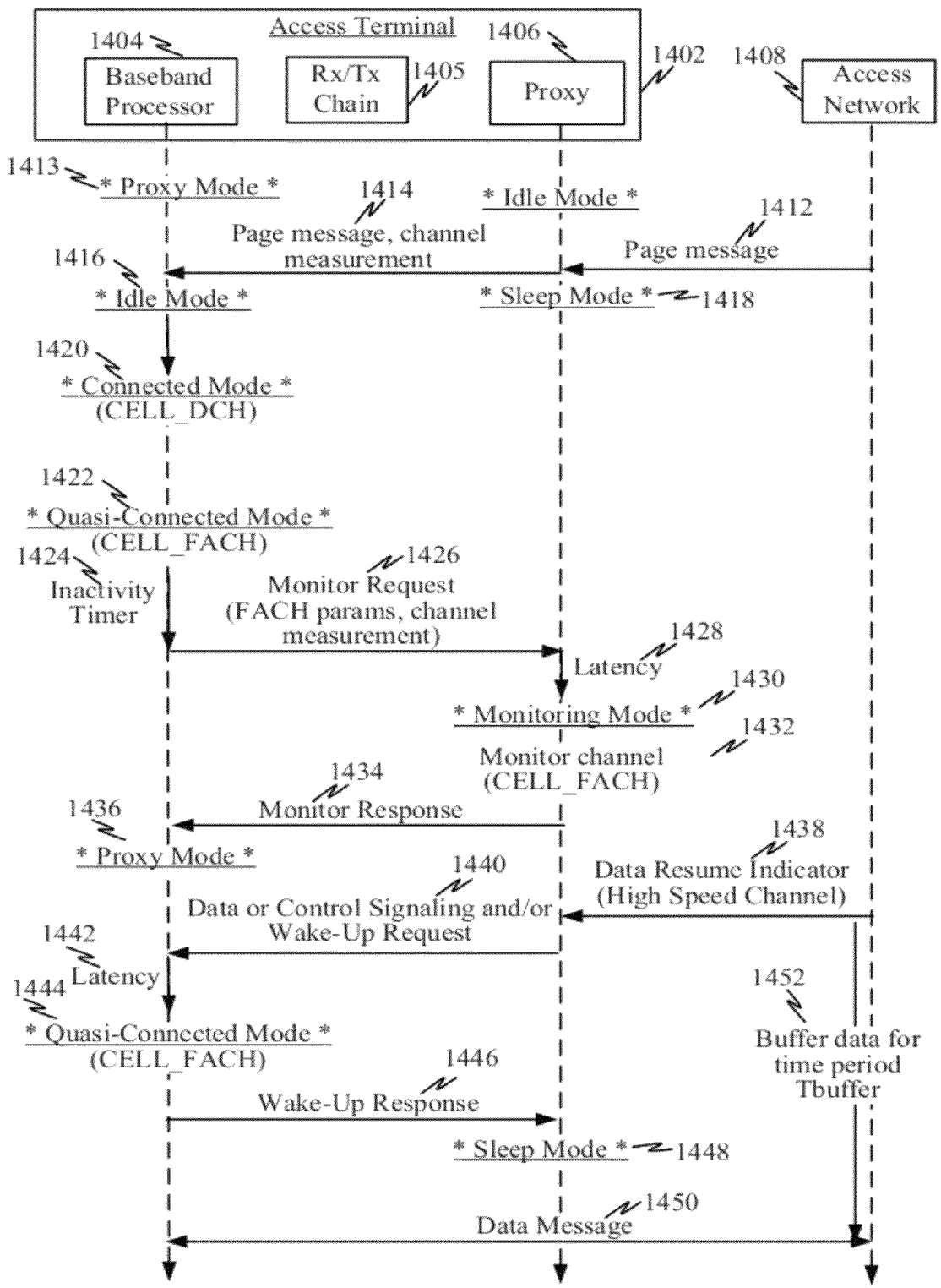
FIG. 14 is a flow diagram illustrating the operation of a wireless communication system in which an access terminal includes an internal proxy that facilitates power conservation when a data resume indicator is available from the access network.

FIG. 14 is a flow diagram illustrating the operation of a wireless communication system in which an access terminal includes an internal proxy that facilitates power conservation when a data resume indicator is available from the access network. This example illustrates one possible implementation of an internal proxy mode for an access terminal 1402 that may include a wireless interface implementing, for example, Radio Resource Control (RRC) according to Universal Mobile Telecommunications System (UMTS) Wideband Code Division Multiple Access (W-CDMA). The access terminal 1402 may be in communication with an access network 1408 (e.g., access node, etc.) over one or more wireless channels. The access terminal 1402 may include, for example, a baseband processor 1404 and receiver/transmitter chain 1405 and a proxy 1406. The receiver/transmitter chain 1405 may be the same as the receiver/transmitter chain 406 in FIG. 4 or 5.

Upon startup, the proxy 1406 may monitor a paging channel for a paging message 1412 on behalf of the access terminal 1402 while the baseband processor 1404 is in proxy mode 1413. When a page message 1412 is received by the proxy 1406, the proxy 1406 forwards the page message and channel measurements 1414 (to expedite future connections between the access terminal 1402 and access network 1408) to the baseband processor 1404. Upon the reception of the page message 1412, the baseband processor 1404 and/or receiver/transmitter chain 1405 may be placed into Idle Mode 1416 while the proxy 1406 may be placed into a Sleep Mode 1418. The baseband processor 1404 and/or receiver/transmitter chain 1405 may then change operating modes to a Connected Mode 1420, which may include RRC state CELL_DCH, and eventually into a Quasi-Connected Mode 1422 (CELL_FACH). When in the CELL_FACH Quasi-Connected Mode 1422, the access terminal 1402 may maintain an inactivity timer 1424 that determines when no communication activity has occurred for a minimum time threshold. That is, if no communication activity is detected in a control, paging, and/or data channel (e.g., FIG. 4, link 411), then the baseband processor 1404 may send a Monitor Request 1426 (e.g., including one or more channel parameters) to the proxy 1406. After a potential latency period 1428 (i.e., due to powering of circuits or switching of operating states), the proxy 1406 may enter into a Monitoring Mode 1430, in which it monitors the channel 1432, and may send a Monitor Response 1434 back to the baseband processor 1404. Upon receipt of the response 1434, the baseband processor 1404 and receiver/transmitter chain 1405 may enter into an internally defined Proxy Mode 1436 in which the baseband processor 1404 and/or receiver/transmitter chain 1405 are completely or substantially powered Off. Note that, in implementations where the proxy 1406 reuses the receiver/transmitter chain 1405, the receiver/transmitter chain 1405 is partially or fully powered On during proxy mode.

Subsequently, when the access network 1408 wishes to send data to the access terminal 1402, it may send a data resume indicator (DRI) 1438, e.g., over a high speed channel. For example, the DRI 1438 may be transmitted by the access network 1408 via a Secondary Common Control Physical Channel (SCCPCH) when implementing a UMTS Pre-Release 7 standard. Alternatively, the DRI 1438 may be transmitted by the access network 1408 via a High Speed Shared Control Channel (HS-SCCH) when implementing a UMTS Release 7 or above standard.

The proxy 1406 may recognize the reception of a DRI for the access terminal as an event to wake-up the baseband processor 1404. The proxy 1406 may send the received DRI and/or a wake-up request 1440 to the baseband processor 1404. Note that, in some instances, the transmission of just the DRI from the proxy 1406 to the baseband processor 1404 (while in proxy mode) may be sufficient indicate to the baseband processor 1404 that it should wake up or turn On to monitor its paging, control, and/or data channel. Upon receipt of the DRI and/or wake-up request 1440, and after a possible latency period 1442 (e.g., to power on circuits), the baseband processor 1404 and receiver/transmitter chain 1405 may be powered On and in Quasi-Connected Mode (CELL_FACH) 1444. The baseband processor 1404 may send a wake-up response 1446 to the proxy 1406, which allows the proxy 1406 to enter into a Sleep Mode 1448. The baseband processor 1404 and/or receiver/transmitter chain 1405 may then monitor the data channel and/or signaling channel for data messages and/or data and/or control signaling directly from the data channel and/or signaling channel, respectively. The access network, after buffering the data for a time period of $T_{buffer}$ 1452, sends that data message 1450 to the access terminal 1402.

Figure 15:
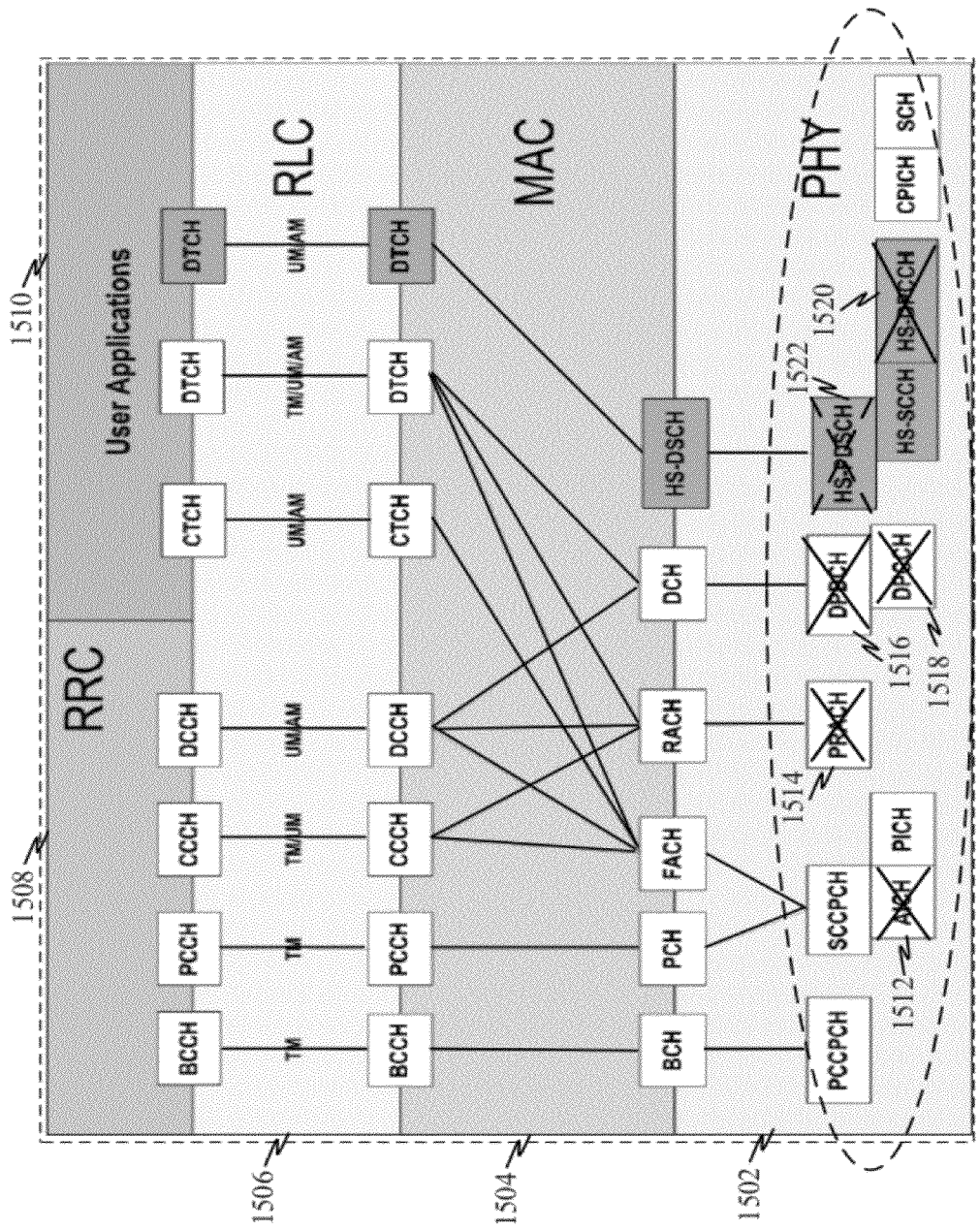
FIG. 15 illustrates channel layers across a protocol stack that may be implemented within an access terminal when DRI is implemented by the access network.

FIG. 15 illustrates channel layers across a protocol stack that may be implemented within an access terminal when DRI is implemented by the access network. In this example, the protocol stack may include a Physical (PHY) Layer 1502, a Medium Access Control (MAC) Layer 1504, a Radio Link Control (RLC) Layer 1506, a Radio Resource Control (RRC) Layer 1508, and Application (APP) Layer 1510. This structure illustrates one example of which channels in the Physical Layer 1502 may be disabled during proxy mode operation of an access terminal when DRI is available. For example, the Acquisition Indicator Channel (AICH) 1512, Physical Random Access Channel (PRACH) 1514, Dedicated Physical Data Channel (DPDCH) 1516, Dedicated Physical Control Channel (DPCCH) 1518, High-Speed Dedicated Physical Control Channel (HS-DPCCH) 1520, and/or High-Speed Physical Downlink Shared Channel (HS-PDSCH) 1522 may be disabled (e.g., corresponding circuits or chains may be powered Off) and therefore, the functionalities for those channels need not be included in the proxy circuit. Because these data channel and/or reverse channel(s) (e.g., from the access terminal 1402 to the access network 1408) are not being used during proxy mode, these channels and components/circuits associated with these channels may be powered Off during proxy mode and need not be supported by the proxy 1506. Consequently, the proxy 1406 may simply support some or all of the remaining (forward) channels in the physical layer for proxy operation.

Figure 16:
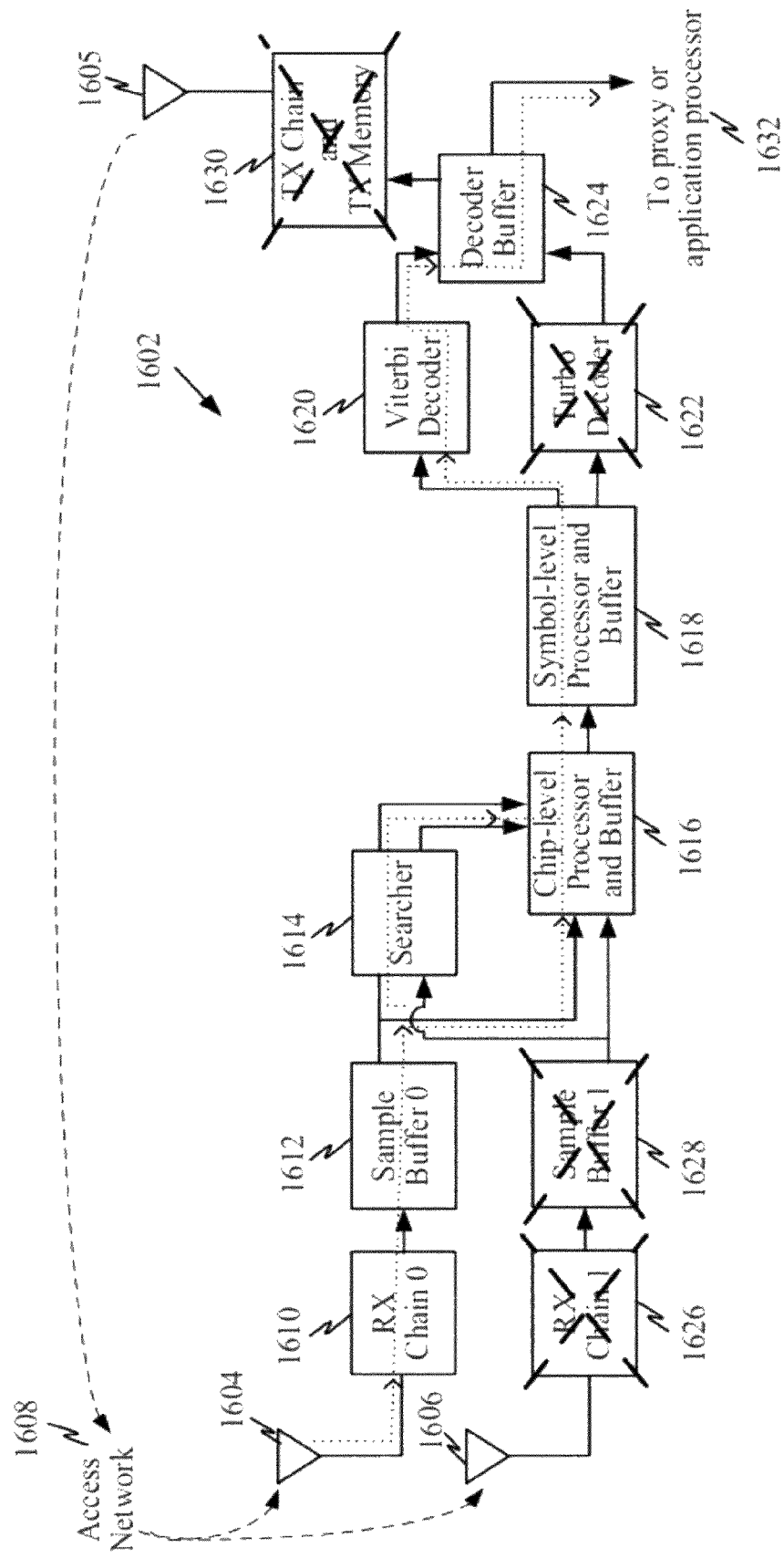
FIG. 16 is a block diagram illustrating how a typical modem architecture may be modified to function and/or operation as a proxy when DRI is implemented by the access network.

FIG. 16 is a block diagram illustrating how a typical modem architecture may be modified to function and/or operation as a proxy when DRI is implemented by the access network. In this example, the proxy may be adapted to operate or monitor one or more channels of a wireless wide area network (WWAN). The typical modem architecture may include a plurality of diversity receivers for a WWAN interface to receive transmissions from an access network 1608. For example, the typical modem architecture may include a first receive antenna 1604 coupled to a first receive chain 1610, and coupled to a first sample buffer 1612 as well as a second receive antenna 1606, coupled to a second receive chain 1626, and coupled to a second sample buffer 1628. Additionally, the modem architecture may also include a first transmit antenna 1605 to transmit to the access network 1608.

However, because the proxy has a specific and limited functionality, the modified modem architecture 1602 may cancel, disable, and/or exclude all but one receiver chain and may exclude all transmitter chains. For example, just the first receive antenna 1606, first receive chain 1610, and first sample buffer 1612 may remain. Therefore, signals received at the first receive antenna 1606, and passing through the first receive chain 1610 and first sample buffer 1612, may then be processed by a searcher 1614 and a chip-level processor and buffer 1616 and then a symbol-level processor and buffer 1618. Subsequently, a Viterbi decoder 1620 and/or process the output from the symbol-level processor and buffer 1618 before passing the decoded symbols to a decoder buffer 1624. The decoded signal may then be passed to a radio wake-up circuit or an application processor 1632. Note that the Turbo decoder 1622 may also be eliminated from this modem architecture 1602 since during proxy mode, only a data resume indicator (DRI) is being sent by the access network in control channels that do not require Turbo decoders. The elimination of the Turbo decoder greatly simplifies the modem architecture and also reduces the power consumption of the proxy circuit.

The modified modem architecture 1602 used by the proxy may serve to monitor a paging channel while other receiver/transmitter chains and/or baseband processor components are turned Off or powered Off. For instance, if an access terminal enters proxy mode where the dedicated internal proxy (including the modified modem architecture 1602) monitors a paging channel on behalf of the access terminal, other receiver chains (e.g., for a data channel) and/or transmitter chains and the primary baseband processor may be turned Off since the data channel is not being monitored. The trade off in adding the proxy (including its modified modem architecture 1602) is that additional components are added to the access terminal but these components operate at lower power than the baseband processor, so power is conserved. Additionally, because the modified modem architecture 1602 is limited to monitoring for data/control signaling over a paging channel, the sample buffer 1612 and/or other buffers may be smaller relative to corresponding buffers used by the baseband processor which has to accommodate transmissions over a data channel.

FIG. 17 is a table illustrating various possible implementation scenarios in which a proxy may monitor one or more channels according to the requirement of one or more operating states for the access terminal when DRI is implemented by the access network. For example, in Scenario 1 the proxy may monitor various physical layer channels according to an Idle mode for the access terminal, including the Primary Synchronization Channel (P-SCH)/Secondary Synchronization Channel (S-SCH), Common Pilot Channel (CPCH), Primary Common Control Physical Channel (P-CCPCH), Secondary Common Control Physical Channel (S-CCPCH), and Paging Indicator Channel (PICH) as defined, for example, in UMTS Standard Release 1999 (R'99) and amended through pre Release 2007 (Rel. 7). That is, the proxy may monitor the physical layer channels that would have been normally monitored by the primary receiver chain and baseband processor when in Idle mode. Referring to the modem architecture of FIG. 16, Scenario 1 illustrates an example where the access terminal is in Idle mode before requesting proxying operations. The modified modem architecture for the proxy does not require the Transmitter or Transmit Memory 1630, Turbo Decoder 1622, Receiver Chain 1 1626, and/or Sample Buffer 1 1628, so these components can be excluded from the proxy.

In Scenario 2, where the access terminal is either in the idle or CELL_FACH states before requesting proxying operations, the proxy may monitor various physical layer channels according to an Idle state and/or CELL_FACH state for the access terminal, including the P-SCH/S-SCH, CPCH, P-CCPCH, S-CCPCH, and PICH channels, as defined, for example, in UMTS Standard R '99 and amended through pre Rel. 7. That is, the proxy may monitor the physical layer channels that would have been normally monitored by the primary receiver chain and baseband processor when in Idle state and/or CELL_FACH state. The chip-level processor may implement a rake receiver while the symbol-level processor may implements a UMTS Standard Release '99 rate matching and interleaving only because high data rate channels such as the ones required in the CELL_DCH state are not supported. Referring to the modem architecture of FIG. 16, Scenario 2 does not require the Transmitter or Transmit Memory 1630, Receiver Chain 1 1626, Sample Buffer 1 1628 and/or Turbo Decoder 1622, so these components can be excluded from the proxy.

In Scenario 3, before requesting proxying operations, the access terminal is either in the idle or CELL_FACH states using High speed (HS) channels. The proxy may monitor various physical layer channels according to an Idle state and/or CELL_FACH state with High Speed (HS) channels for the access terminal, including the P-SCH/S-SCH, CPCH, P-CCPCH, S-CCPCH, PICH, High Speed (HS) Shared Control Channel (SCCH), High Speed-Physical Downlink Shared Channel (HS-PDSCH) channels, as defined, for example, in UMTS Standard R '99 and amended through Rel. 7 and later. That is, the proxy may monitor the physical layer channels that would have been normally monitored by the primary receiver chain and baseband processor when in Idle state and/or CELL_FACH state with High Speed channels. Referring to the modem architecture of FIG. 16, Scenario 3 does not require the Transmitter or Transmit Memory 1630, Receiver Chain 1 1626, and/or Sample Buffer 1 1628, and/or Turbo Decoder 1622, so these components can be excluded from the proxy. To support the HS channels detection, an equalizer might be required in the chip-level processor where HSDPA rate matching functionality is also required in the symbol-level processor. Despite these functionalities, the chip-level and symbol-level processors can still be streamlined and designed to be smaller and more power efficient than modems that support high data rate channels used in the CELL_DCH state.

In order for the proxy to identify when a particular data or control signal is intended for the access terminal, it may perform such identification based on the operating mode for which it monitors. For example, when the proxy performs channel monitoring according to an Idle state for the access terminal (e.g., as in Scenarios 1, 2, or 3), it may identify whether a data/control signal from the access terminal in the signaling channel is for its access terminal by identifying information at the RRC layer (e.g., RRC Layer 1508 in FIG. 15). The packet may be carried over the Broadcast Control Channel (BCCH) and/or Paging Control Channel (PCCH). Similarly, when the proxy performs channel monitoring for an access terminal in the CELL_FACH state (e.g., as in Scenarios 2 or 3), the identification can be categorized into two groups based on the Physical layer channel (e.g. Physical Layer 1502 in FIG. 15) used in transmission i.e. the High Speed-Physical Downlink Shared Channel (HS-PDSCH) or Secondary Common Control Physical Channel (S-CCPCH).

The first category relates to when page, data or control information is received on the HS-DPSCH, the identity of the access terminal is encoded in the associated control channel (e.g., the High Speed Shared Control Channel (HS-SCCH)). The type of the access terminal identity encoded in the HS-SCCH depends on the logical channel that was used in carrying the information. For instance, the HS-SCCH packet may be masked with a BCCH specific HS-DSCH Radio Network Identifier (H-RNTI) for Broadcast Control Channel (BCCH) data, a common HRNTI is used for the Common Control Channel (CCCH), or a dedicated H-RNTI for the Dedicated Control Channel (DCCH)/Dedicated Traffic Channel (DTCH).

The second category involves using the S-CCPCH channel as the physical channel. For this category, the access terminal identification is not possible at the Physical layer like the HS channels, instead, the identification is made at the MAC or RRC layer depending on the logical channels that carried the packet. For packets sent through the DCCH or DTCH channels, the access terminal identification occurs at the MAC Layer (e.g., MAC Layer 1504 in FIG. 15) by using a packet header that identifies, for example, the UTRAN network temporary identity (URNTI) for the access terminal. For packets sent through the BCCH or CCCH channels, the access terminal identification occurs at the RRC layer (e.g., RRC layer 1508 in FIG. 15) using the access terminal's International Mobile Subscriber Identity (IMSI).

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-8, 10, 12, 14 and/or 16 may be configured to perform one or more of the methods, features, or steps described in FIGS. 2, 3, 9, 11, 13, 15 and/or 17. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An access terminal comprising:
a dedicated proxy circuit;
a first receiver/transmitter chain; and
a baseband processor communicatively coupled to the first receiver/transmitter chain to communicate with an access network over a plurality of wireless channels, the baseband processor also communicatively coupled to the proxy circuit and adapted to switch to a power conservation mode if at least some of the plurality of wireless channels have been inactive for at least a threshold amount of time, wherein the power conservation mode the proxy circuit independently monitors at least a first channel from the plurality of wireless channels while the baseband processor is in the power conservation mode.

2. The access terminal of claim 1, wherein the plurality of wireless channels include one or more data channels and one or more control channels.

3. The access terminal of claim 1, wherein the first channel is a paging channel.

4. The access terminal of claim 1, wherein the first channel is a control channel.

5. The access terminal of claim 1, wherein the first channel includes a forward access channel carrying at least one of paging signals, data signals or control signals.

6. The access terminal of claim 1, wherein monitoring of the first channel by the proxy circuit is transparent to the access network.

7. The access terminal of claim 1, wherein the power conservation mode the baseband processor is in either a low power mode or an off mode.

8. The access terminal of claim 1, wherein the power conservation mode the baseband processor is unable to monitor the plurality of wireless channels.

9. The access terminal of claim 1, wherein the baseband processor switches to the power conservation mode by:
determining that at least some of the plurality of wireless channels have been inactive for at least the threshold amount of time; and
sending a proxy request to the proxy circuit prior to switching to the power conservation mode.

10. The access terminal of claim 1, wherein the baseband processor is further adapted to:
switch from the power conservation mode to a quasi-connected or connected mode upon receiving a wake-up signal from the proxy circuit indicating that a data or control signal has been received for the access terminal.

11. The access terminal of claim 10, wherein the baseband processor is further adapted to:
send a wake-up signal response to the proxy circuit upon switching to the quasi-connected or connected mode, where the wake-up signal response causes the proxy circuit to switch to a low power mode or an off mode.

12. The access terminal of claim 10, wherein proxy circuit is further configured to:
forward the received data or control signal to the baseband processor.

13. The access terminal of claim 10, wherein the quasi-connected mode is a Cell Forward Access (CELL_FACH) state as defined in a Radio Resource Control (RRC) layer of a Universal Mobile Telecommunications System (UMTS) Wideband Code Division Multiple Access (W-CDMA) wireless interface standard.

14. The access terminal of claim 1, wherein the proxy circuit includes an independent receiver chain to monitor the first channel.

15. The access terminal of claim 14, wherein upon receipt of a proxy request from the baseband processor the proxy circuit monitors the first channel for incoming data or control signals, and upon receipt of a data or control signal for the access terminal, the proxy circuit sends a wake-up signal to the baseband processor.

16. The access terminal of claim 14, wherein upon switching the baseband processor to the power conservation mode, the first receiver/transmitter chain is also switched to the power conservation mode.

17. The access terminal of claim 14, wherein the proxy circuit further includes:
a processing circuit coupled to the independent receiver chain and adapted to determine whether a data or control signal received over the first channel is intended for the access terminal; and
a wake-up radio circuit coupled to the processing circuit and the baseband processor and adapted to send a wake-up signal to the baseband processor to cause the baseband processor to switch to a quasi-connected or connected mode.

18. The access terminal of claim 17, wherein in the power conservation mode the baseband processor is unable to monitor the first channel, and in the quasi-connected or connected mode the baseband processor is able to monitor the plurality of wireless channels.

19. The access terminal of claim 1, wherein the proxy circuit reuses at least a portion of the first receiver/transmitter chain to monitor the first channel.

20. The access terminal of claim 19, wherein the first receiver/transmitter chain is at least partially operational when the baseband processor is in the power conservation mode.

21. The access terminal of claim 1, wherein the baseband processor also shuts down the first receiver/transmitter chain when it enters the power conservation mode and starts up the first receiver/transmitter chain when a wake-up signal is received from the proxy circuit.

22. The access terminal of claim 1, wherein the access network provides a data resume indicator over the first channel prior to transmitting a data message over a data channel within the plurality of wireless channels.

23. The access terminal of claim 22, wherein the proxy circuit forwards a received data resume indicator to the baseband processor and this acts as a wake-up signal to the baseband processor.

24. The access terminal of claim 1, wherein the first receiver/transmitter chain is coupled to a first antenna for monitoring the plurality of wireless channels while the proxy circuit is coupled to a separate second antenna for monitoring the first channel.

25. The access terminal of claim 1, wherein the proxy circuit consumes less power than the baseband processor for the same amount of channel monitoring time.

26. A method operational on an access terminal comprising:
operating a first receiver/transmitter chain and a baseband processor in a quasi-connected or connected mode where at least some of a plurality of wireless channels are monitored for incoming transmissions to the access terminal from an access network;
sending a proxy request from the baseband processor to a dedicated proxy circuit within the access terminal if at least some of the plurality of wireless channels have been inactive for at least a threshold amount of time; and
switching the baseband processor to a power conservation mode while the proxy circuit monitors a first channel from the plurality of wireless channels.

27. The method of claim 26, wherein the first channel is at least one of a paging channel or a control channel.

28. The method of claim 26, further comprising:
sending a wake-up signal from the proxy circuit to the baseband processor if a data or control signal is received for the access terminal, where the wake-up signal causes the baseband processor to switch to either the quasi-connected or connected mode.

29. The method of claim 28, further comprising:
sending a wake-up signal response to the proxy circuit upon switching to the quasi-connected or connected mode, where the wake-up signal response causes the proxy circuit to switch to a low power mode or an off mode.

30. The method of claim 26, further comprising:
forwarding a received data or control signal from the proxy circuit to the baseband processor.

31. The method of claim 26, wherein monitoring of the first channel by the proxy circuit is transparent to the access network.

32. The method of claim 26, further comprising:
receiving a data resume indicator over the first channel at the proxy circuit from the access network, the data resume indicator indicating that the access network is about to send a data message; and
sending a wake-up signal from the proxy circuit to the baseband processor in response to receipt of the data resume indicator.

33. An access terminal comprising:
- means for operating a first receiver/transmitter chain and a baseband processor in a quasi-connected or connected mode where at least some of a plurality of wireless channels are monitored for incoming transmissions to the access terminal from an access network;
- means for sending a proxy request from the baseband processor to a dedicated proxy circuit within the access terminal if at least some of the plurality of wireless channels have been inactive for at least a threshold amount of time; and
- means for switching the baseband processor to a power conservation mode while the proxy circuit monitors a first channel from the plurality of wireless channels.

34. The access terminal of claim 33, further comprising:
- means for sending a wake-up signal to the baseband processor if a data or control signal is received for the access terminal, where the wake-up signal causes the baseband processor to switch to the quasi-connected or connected mode.

35. The access terminal of claim 34, further comprising:
- means for sending a wake-up signal response to the proxy circuit upon switching to the quasi-connected or connected mode, where the wake-up signal response causes the proxy circuit to switch to a low power mode or an off mode.

36. A non-transitory processor-readable medium having one or more instructions operational on an access terminal for power conservation, which when executed by a processor causes the processor to:
- operate a first receiver/transmitter chain and a baseband processor in a quasi-connected or connected mode where at least some of a plurality of wireless channels are monitored for incoming transmissions to the access terminal from an access network;
- send a proxy request from the baseband processor to a dedicated proxy circuit within the access terminal if at least some of the plurality of wireless channels have been inactive for at least a threshold amount of time; and
- switch the baseband processor to a power conservation mode while the proxy circuit monitors a first channel from the plurality of wireless channels.

37. The processor-readable medium of claim 36, further comprising one or more instructions which when executed by a processor causes the processor to:
- send a wake-up signal from the proxy circuit to the baseband processor if a data or control signal is received for the access terminal, where the wake-up signal causes the baseband processor to switch to the quasi-connected or connected mode; and
- send a wake-up signal response from the baseband processor to the proxy circuit upon switching to the quasi-connected or connected mode, where the wake-up signal response causes the proxy circuit to switch to a low power mode or an off mode.

* * * * *